United States Patent
Akiike et al.

(10) Patent No.: US 10,177,362 B2
(45) Date of Patent: Jan. 8, 2019

(54) COMPOSITION FOR NON-AQUEOUS SECONDARY BATTERY FUNCTIONAL LAYER, FUNCTIONAL LAYER-EQUIPPED SUBSTRATE FOR NON-AQUEOUS SECONDARY BATTERY, METHOD FOR PRODUCING LAMINATE FOR NON-AQUEOUS SECONDARY BATTERY, AND NON-AQUEOUS SECONDARY BATTERY

(71) Applicant: ZEON CORPORATION, Chiyoda-ku, Tokyo (JP)

(72) Inventors: Junnosuke Akiike, Tokyo (JP); Tomokazu Sasaki, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/325,563

(22) PCT Filed: Jun. 25, 2015

(86) PCT No.: PCT/JP2015/003199
§ 371 (c)(1),
(2) Date: Jan. 11, 2017

(87) PCT Pub. No.: WO2016/017066
PCT Pub. Date: Feb. 4, 2016

(65) Prior Publication Data
US 2017/0155107 A1    Jun. 1, 2017

(30) Foreign Application Priority Data
Jul. 30, 2014 (JP) .................................. 2014-155120

(51) Int. Cl.
*H01M 2/16* (2006.01)
*H01M 4/13* (2010.01)
(Continued)

(52) U.S. Cl.
CPC ............ *H01M 2/168* (2013.01); *H01M 2/145* (2013.01); *H01M 2/16* (2013.01); *H01M 4/13* (2013.01);
(Continued)

(58) Field of Classification Search
CPC .. H01M 2/168; H01M 10/0525; H01M 2/145; H01M 4/139
(Continued)

(56) References Cited

U.S. PATENT DOCUMENTS

2015/0333310 A1\* 11/2015 Choi ..................... H01M 2/162
                                                                429/145
2016/0141575 A1    5/2016 Sasaki et al.
(Continued)

FOREIGN PATENT DOCUMENTS

CN    105283979 A    1/2016
CN    105324868 A    2/2016
(Continued)

OTHER PUBLICATIONS

Oct. 6, 2015, International Search Report issued in the International Patent Application No. PCT/JP2015/003199.
(Continued)

*Primary Examiner* — Gary D Harris
(74) *Attorney, Agent, or Firm* — Kenja IP Law PC

(57) ABSTRACT

Provided is a composition for a non-aqueous secondary battery functional layer capable of forming a functional layer for a non-aqueous secondary battery that can provide a battery component with high blocking resistance and cause excellent adhesiveness to be displayed before and after immersion in electrolysis solution. The composition contains a particulate polymer having a core-shell structure including a core portion and a shell portion partially covering an outer surface thereof. The core portion is formed by
(Continued)

a polymer having a glass transition temperature of −50° C. to 60° C. and a degree of swelling in electrolysis solution of at least a factor of 5 and no greater than a factor of 30. The shell portion is formed by a polymer having a glass transition temperature of 50° C. to 200° C. and a degree of swelling in electrolysis solution of greater than a factor of 1 and no greater than a factor of 4.

7 Claims, 1 Drawing Sheet

(51) Int. Cl.
H01M 4/139 (2010.01)
H01M 2/14 (2006.01)
H01M 10/0525 (2010.01)

(52) U.S. Cl.
CPC ....... *H01M 4/139* (2013.01); *H01M 10/0525* (2013.01)

(58) Field of Classification Search
USPC .......................................................... 429/246
See application file for complete search history.

(56) References Cited

U.S. PATENT DOCUMENTS

| | | | |
|---|---|---|---|
| 2016/0141581 A1 | 5/2016 | Sasaki et al. | |
| 2017/0200932 A1 | 7/2017 | Sasaki et al. | |

FOREIGN PATENT DOCUMENTS

| | | |
|---|---|---|
| CN | 106463675 A | 2/2017 |
| EP | 2835844 A1 | 2/2015 |
| EP | 3021380 A1 | 5/2016 |
| EP | 3163653 A1 | 5/2017 |
| JP | 2012204303 A | 10/2012 |
| JP | 2013145763 A | 7/2013 |
| JP | 2015028842 A | 2/2015 |
| JP | 2015028843 A | 2/2015 |
| WO | 2013151144 A1 | 10/2013 |
| WO | 2015005145 A1 | 1/2015 |

OTHER PUBLICATIONS

Dec. 1, 2017, Extended European Search Report issued by the European Patent Office in the corresponding European Patent Application No. 15827714.5.

Jan. 31, 2017, International Preliminary Report on Patentability issued in the International Patent Application No. PCT/JP2015/003199.

\* cited by examiner

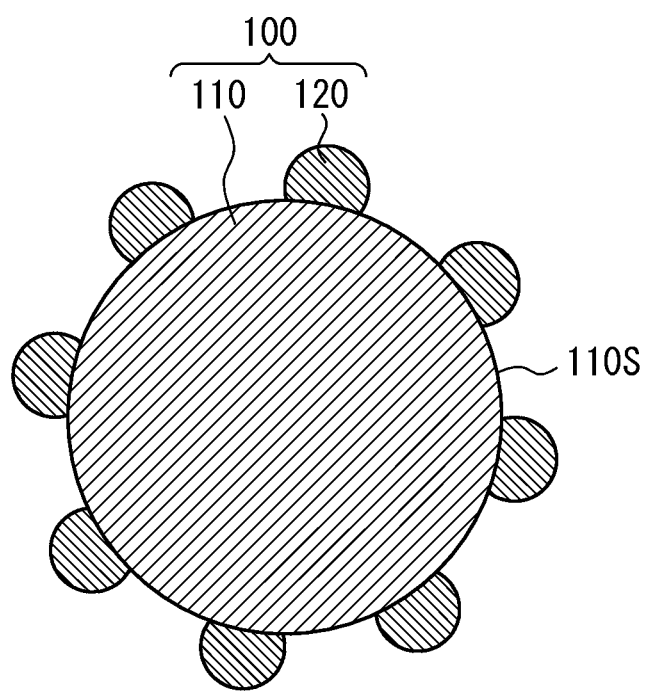

COMPOSITION FOR NON-AQUEOUS SECONDARY BATTERY FUNCTIONAL LAYER, FUNCTIONAL LAYER-EQUIPPED SUBSTRATE FOR NON-AQUEOUS SECONDARY BATTERY, METHOD FOR PRODUCING LAMINATE FOR NON-AQUEOUS SECONDARY BATTERY, AND NON-AQUEOUS SECONDARY BATTERY

TECHNICAL FIELD

The present disclosure relates to a composition for a non-aqueous secondary battery functional layer, a functional layer-equipped substrate for a non-aqueous secondary battery, a method for producing a laminate for a non-aqueous secondary battery, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy-density, and the ability to be repeatedly charged and discharged, and are used in a wide variety of applications. A non-aqueous secondary battery generally includes battery components such as electrodes (positive electrode and negative electrode) and a separator that isolates the positive electrode and the negative electrode from one another and prevents short circuiting between the positive electrode and the negative electrode.

In recent years, battery components including functional layers, such as an adhesive layer provided in order to improve adhesiveness between battery components, have been used in secondary batteries. Specific examples of such battery components that have been used include an electrode that is obtained by further forming a functional layer on an electrode substrate formed by providing an electrode mixed material layer on a current collector and a separator that is obtained by forming a functional layer on a separator substrate (for example, refer to PTL 1).

Specifically, PTL 1 proposes a separator for a secondary battery that is obtained by forming a porous membrane containing non-conductive particles and a binder as a layer on a separator substrate and further forming an adhesive layer containing a specific particulate polymer on the porous membrane layer. PTL 1 reports that through use of this separator including the adhesive layer, favorable adhesion between the separator and an electrode can be achieved through the adhesive layer and battery characteristics of a secondary battery can be improved.

CITATION LIST

Patent Literature

PTL 1: WO 2013/151144 A1

SUMMARY

Technical Problem

However, the adhesiveness of an adhesive layer in which a conventional particulate polymer is used, such as described above, tends to decrease upon immersion in an electrolysis solution. This may result in a non-aqueous secondary battery that includes the adhesive layer having inadequate battery characteristics (high-temperature cycle characteristics and low-temperature output characteristics).

Therefore, there is room for improvement with respect to conventional adhesive layers such as described above in terms of displaying high adhesiveness even after immersion in an electrolysis solution.

Moreover, in production of a non-aqueous secondary battery, a battery component obtained by forming a functional layer, such as an adhesive layer, on a substrate, such as a separator substrate, is normally wound as produced before being stored and transported. However, in the case of battery components in which conventional adhesive layers such as described above are formed, adjacent battery components may stick to one another through the adhesive layers during storage and transportation (i.e., blocking may occur). Therefore, there is also demand for inhibition of such blocking.

The inventors conducted diligent investigation relating to the areas for further improvement and demand described above. The inventors conceived of an idea that it may be possible to obtain a functional layer that displays high adhesiveness even after immersion in an electrolysis solution and that has excellent blocking resistance by forming the functional layer (hereinafter, a layer that can function as an adhesive layer is referred to as a "functional layer") using a particulate polymer that does not display high adhesiveness while not in a swollen state in an electrolysis solution, and only displays adhesiveness upon swelling in an electrolysis solution.

However, upon conducting further investigation, it became clear in a situation in which a particulate polymer is used that only displays adhesiveness upon swelling in an electrolysis solution, a new problem described below arises in production of a secondary battery. Specifically, it was found that in a situation in which a battery component including a functional layer in which a particulate polymer that only displays adhesiveness upon swelling in an electrolysis solution is used and in which battery components are laminated with the functional layer in-between in production of a secondary battery and are then wound up as necessary, there is a problem that a defect may occur due to a deviation in position, such as a winding deviation, of the laminated battery components in production of the secondary battery as a result of the functional layer not displaying high adhesiveness before immersion in an electrolysis solution.

Accordingly, one objective of the present disclosure is to provide a composition for a non-aqueous secondary battery functional layer capable of forming a functional layer for a non-aqueous secondary battery that can provide a battery component with high blocking resistance and cause excellent adhesiveness to be displayed both before and after immersion in an electrolysis solution.

Another objective of the present disclosure is to provide a functional layer-equipped substrate for a non-aqueous secondary battery that can provide a battery component with high blocking resistance and cause excellent adhesiveness to be displayed both before and after immersion in an electrolysis solution.

Another objective of the present disclosure is to provide a method for producing a laminate for a non-aqueous secondary battery in which a separator substrate and an electrode substrate are adhered to one another through a functional layer, wherein the separator substrate and the electrode substrate are strongly adhered through the functional layer both before and after immersion in an electrolysis solution.

Another objective of the present disclosure is to provide a non-aqueous secondary battery having excellent battery characteristics such as high-temperature cycle characteristics and low-temperature output characteristics.

Solution to Problem

The inventors conducted diligent investigation with the aim of solving the problems described above. As a result, the inventors discovered that a functional layer that is capable of providing a battery component with high blocking resistance and causing excellent adhesiveness to be displayed both before and after immersion in an electrolysis solution can be obtained through use of a particulate polymer having a specific core-shell structure and specific properties.

Specifically, the present disclosure aims to advantageously solve the problems described above by disclosing a composition for a non-aqueous secondary battery functional layer that comprises a particulate polymer, wherein the particulate polymer has a core-shell structure including a core portion and a shell portion that partially covers an outer surface of the core portion, the core portion is formed by a polymer having a glass transition temperature of at least −50° C. and no higher than 60° C. and a degree of swelling in electrolysis solution of at least a factor of 5 and no greater than a factor of 30, and the shell portion is formed by a polymer having a glass transition temperature of at least 50° C. and no higher than 200° C. and a degree of swelling in electrolysis solution of greater than a factor of 1 and no greater than a factor of 4. Thus, it is possible to provide a functional layer that is capable of providing a battery component with high blocking resistance and displaying excellent adhesiveness both before and after immersion in an electrolysis solution by forming the functional layer using the composition containing the particulate polymer having the specific core-shell structure and the specific properties described above.

The "glass transition temperature" and the "degree of swelling in electrolysis solution" of the polymer of the core portion and the polymer of the shell portion in the particulate polymer can be measured by measurement methods described in the EXAMPLES section of the present specification.

In the presently disclosed composition for a non-aqueous secondary battery functional layer, the glass transition temperature of the polymer forming the core portion of the particulate polymer is preferably lower than the glass transition temperature of the polymer forming the shell portion of the particulate polymer. When the glass transition temperature of the polymer forming the core portion is lower than the glass transition temperature of the polymer forming the shell portion, the specific core-shell structure can be favorably maintained even upon heating and the particulate polymer can favorably display the performance desired thereof.

Moreover, the present disclosure aims to advantageously solve the problems described above by disclosing a functional layer-equipped substrate for a non-aqueous secondary battery comprising a substrate; and a functional layer formed on the substrate, wherein the functional layer is formed by using the composition for a non-aqueous secondary battery functional layer described above. Through the functional layer-equipped substrate for a non-aqueous secondary battery described above, which is obtained by forming the functional layer on the substrate using the aforementioned composition for a non-aqueous secondary battery functional layer, it is possible to provide a battery component with high blocking resistance and cause excellent adhesiveness to be displayed both before and after immersion in an electrolysis solution.

Herein, the substrate on which the functional layer is formed is preferably a separator substrate or an electrode substrate. When the functional layer is formed on a separator substrate or an electrode substrate, the resultant product can be used, as produced, as a functional layer-containing separator or a functional layer-containing electrode, which raises battery component production efficiency.

Note that an optional layer having a desired function, other than the aforementioned functional layer, may constitute part of the separator substrate or the electrode substrate.

Furthermore, the present disclosure aims to advantageously solve the problems described above by providing a method for producing a laminate for a non-aqueous secondary battery in which a separator substrate, a functional layer, and an electrode substrate are laminated, the method comprising: laminating the separator substrate and the electrode substrate with the functional layer in-between (laminating step); and heating the functional layer such as to cause adhesion, through the functional layer, of the separator substrate and the electrode substrate that have been laminated (adhesion step), wherein the functional layer is formed by using any one of the compositions for a non-aqueous secondary battery functional layer described above. Through use of the functional layer formed using the composition that contains the particulate polymer having the specific core-shell structure and the specific properties described above, and through heating of the functional layer to cause adhesion between the separator substrate and the electrode substrate, it is possible to produce a laminate for a non-aqueous secondary battery in which a separator substrate and an electrode substrate are strongly adhered to one another through a functional layer both before and after immersion in an electrolysis solution.

In the presently disclosed method for producing a laminate for a non-aqueous secondary battery, the glass transition temperature of the polymer forming the core portion of the particulate polymer is preferably lower than the glass transition temperature of the polymer forming the shell portion of the particulate polymer, and the heating of the functional layer is preferably performed to a temperature that is at least as high as the glass transition temperature of the polymer forming the core portion of the particulate polymer and lower than the glass transition temperature of the polymer forming the shell portion of the particulate polymer. When the glass transition temperature of the polymer of the core portion is lower than that of the shell portion and the heating temperature of the functional layer is within the aforementioned range, the separator substrate and the electrode substrate can be caused to adhere more strongly before immersion in an electrolysis solution. Moreover, the particulate polymer can maintain the specific core-shell structure even after heating of the functional layer and can, therefore, display the performance desired thereof.

Also, the present disclosure aims to advantageously solve the problems described above by disclosing a non-aqueous secondary battery comprising a laminate for a non-aqueous secondary battery that is producible by the method for producing a laminate for a non-aqueous secondary battery described above. Through use of a laminate for a non-aqueous secondary battery that is produced by the method described above, it is possible to provide a non-aqueous secondary battery having excellent battery characteristics such as high-temperature cycle characteristics and low-temperature output characteristics.

Advantageous Effect

According to the present disclosure, it is possible to provide a composition for a non-aqueous secondary battery functional layer capable of forming a functional layer for a non-aqueous secondary battery that can provide a battery component with high blocking resistance and cause excellent adhesiveness to be displayed both before and after immersion in an electrolysis solution.

Moreover, according to the present disclosure, it is possible to provide a functional layer-equipped substrate for a non-aqueous secondary battery that can provide a battery component with high blocking resistance and cause excellent adhesiveness to be displayed both before and after immersion in an electrolysis solution.

Furthermore, according to the present disclosure, it is possible to provide a method for producing a laminate for a non-aqueous secondary battery in which a separator substrate and an electrode substrate are adhered to one another through a functional layer, wherein the separator substrate and the electrode substrate are strongly adhered through the functional layer both before and after immersion in an electrolysis solution.

Also, according to the present disclosure, it is possible to provide a non-aqueous secondary battery having excellent battery characteristics such as high-temperature cycle characteristics and low-temperature output characteristics.

BRIEF DESCRIPTION OF THE DRAWING

In the accompanying drawing,

FIG. 1 is a cross-sectional view schematically illustrating an example of structure of a particulate polymer contained in a presently disclosed composition for a non-aqueous secondary battery functional layer.

DETAILED DESCRIPTION

The following provides a detailed description of an embodiment of the present disclosure.

Herein, a presently disclosed composition for a non-aqueous secondary battery functional layer is used in production of a presently disclosed functional layer-equipped substrate for a non-aqueous secondary battery in which a functional layer is formed on a substrate. A functional layer formed using the presently disclosed composition for a non-aqueous secondary battery functional layer may, for example, be used as an adhesive layer that adheres battery components such as a separator and an electrode to one another and may be formed on a separator substrate or an electrode substrate such as to constitute part of a separator or an electrode. Note that the functional layer formed using the presently disclosed composition for a non-aqueous secondary battery functional layer may, for example, function as a porous membrane layer for improving heat resistance and strength of a battery component such as a separator or an electrode. A presently disclosed method for producing a laminate for a non-aqueous secondary battery at least makes use of a functional layer that is formed using the presently disclosed composition for a non-aqueous secondary battery functional layer. Moreover, a presently disclosed non-aqueous secondary battery includes a laminate for a non-aqueous secondary battery that is produced by the presently disclosed method for producing a laminate for a non-aqueous secondary battery.

(Composition for Non-Aqueous Secondary Battery Functional Layer)

The composition for a non-aqueous secondary battery functional layer is a slurry composition that has water or the like as a dispersion medium, contains at least a particulate polymer having a specific structure and specific properties, and may optionally contain a binder for a functional layer, non-conductive particles (exclusive of those within the scope of the particulate polymer and the binder for a functional layer), and other components.

A functional layer formed using the presently disclosed composition for a non-aqueous secondary battery functional layer can provide a battery component that includes the functional layer at the surface thereof with high blocking resistance, can exhibit excellent adhesiveness both before and after immersion in an electrolysis solution, and can cause a non-aqueous secondary battery to display excellent battery characteristics.

<Particulate Polymer>

The particulate polymer contained in the composition for a non-aqueous secondary battery functional layer has a function of causing a functional layer formed using the composition for a non-aqueous secondary battery functional layer to display excellent adhesiveness. The particulate polymer has a core-shell structure including a core portion and a shell portion that partially covers an outer surface of the core portion. The core portion is formed by a polymer having a glass transition temperature of at least −50° C. and no higher than 60° C. and a degree of swelling in electrolysis solution of at least a factor of 5 and no greater than a factor of 30. The shell portion is formed by a polymer having a glass transition temperature of at least 50° C. and no higher than 200° C. and a degree of swelling in electrolysis solution of greater than a factor of 1 and no greater than a factor of 4.

The particulate polymer having the described structure and properties displays excellent adhesiveness in an electrolysis solution (i.e., after immersion in an electrolysis solution), but does not normally display high adhesiveness while not in a swollen state in an electrolysis solution (i.e., in a state before immersion in an electrolysis solution). Moreover, although the particulate polymer having the described structure and properties does not normally display high adhesiveness while not in a swollen state in an electrolysis solution, the particulate polymer can be caused to display excellent adhesiveness through heating. Therefore, a functional layer that is formed using the composition for a non-aqueous secondary battery functional layer containing the aforementioned particulate polymer can favorably inhibit blocking of a battery component that includes the functional layer (i.e., sticking of battery components to one another through the functional layer) and can also display excellent adhesiveness both before and after immersion in an electrolysis solution. Accordingly, when a functional layer is formed using the composition for a non-aqueous secondary battery functional layer, a battery component that includes the functional layer can be caused to display excellent blocking resistance during storage and transport of the battery component and, in production of a secondary battery, laminated battery components can be caused to favorably adhere to one another through the adhesive layer by heating such as to inhibit the occurrence of defects due to a deviation in position, such as a winding deviation, of the laminated battery components during battery production. Furthermore, the battery components can be caused to strongly adhere to one another even after immersion in an electrolysis solution, and thus a secondary battery can be caused to display excellent battery characteristics (high-temperature cycle characteristics and low-temperature output characteristics).

Although the reason that excellent effects such as described above can be achieved through use of this particulate polymer has not yet been clarified, the reason is presumed to be as follows.

Specifically, the polymer forming the shell portion of the particulate polymer swells in an electrolysis solution. When this swelling occurs, the shell portion can strongly adhere to a battery component (for example, a separator substrate or electrode substrate on which a functional layer is formed or an electrode or separator that adheres to a battery component including a functional layer) as a result of, for example, functional groups in the polymer of the shell portion being activated and forming chemical or electrical interactions with functional groups at the surface of the battery component. It is presumed that for this reason, it is possible to cause strong adhesion between battery components (for example, a separator and an electrode) in an electrolysis solution through a functional layer that contains the particulate polymer.

Furthermore, since the use of a functional layer containing the particulate polymer enables strong adhesion between a separator and an electrode in an electrolysis solution as described above, a space does not easily form between battery components (for example, between a separator and an electrode) that are adhered through the functional layer in a secondary battery that includes the functional layer. Consequently, in a secondary battery in which a functional layer containing the particulate polymer is used, the distance between a positive electrode and a negative electrode inside of the secondary battery does not easily increase, internal resistance of the secondary battery can be minimized, and non-uniformity of a reaction site of an electrochemical reaction at an electrode does not easily occur. Furthermore, a space does not easily form between a separator and an electrode in the secondary battery even upon repeated charging and discharging, and thus the battery capacity of the secondary battery does not easily decrease. It is presumed that for this reason, excellent battery characteristics such as high-temperature cycle characteristics can be achieved.

The polymer forming the core portion of the particulate polymer displays a high degree of swelling in an electrolysis solution. When the polymer is in a highly-swollen state in an electrolysis solution, the spaces between molecules of the polymer become larger, which allows ions to pass more easily between the molecules. Moreover, the polymer of the core portion of the particulate polymer is not completely covered by the shell portion. Therefore, the particulate polymer displays high ion diffusibility in an electrolysis solution since ions can easily pass through the core portion. Accordingly, an increase in resistance due to a functional layer and deterioration of battery characteristics such as low-temperature output characteristics can be inhibited through use of the particulate polymer described above.

When the particulate polymer is not in a swollen state in an electrolysis solution, functional groups included in the polymer of the shell portion are not activated. Moreover, the glass transition temperature of the polymer forming the shell portion is relatively high and the glass transition temperature of the polymer forming the core portion is not excessively low. Consequently, the particulate polymer does not normally display adhesiveness when not in a swollen state in an electrolysis solution. Therefore, in a situation in which a battery component that includes a functional layer containing the particulate polymer, such as a separator or an electrode, is wound such as to overlap, it is presumed that blocking does not easily occur because the functional layer containing the particulate polymer does not normally display high adhesiveness when not in a swollen state in an electrolysis solution.

Moreover, since the glass transition temperature of the polymer forming the core portion is relatively low and the glass transition temperature of the polymer forming the shell portion is not excessively high in the particulate polymer, at least the polymer forming the core portion can be caused to display fluidity and adhesiveness can be realized even when the particulate polymer in not swollen in an electrolysis solution by, for example, heating the particulate polymer to a specific temperature (for example, a temperature at least as high as the glass transition temperature of the polymer forming the core portion). It is presumed that for this reason, in a situation in which a battery component that includes a functional layer containing the particulate polymer, such as a separator or an electrode, is wound, it is possible to inhibit the occurrence of a winding deviation by heating the functional layer so that the functional layer displays adhesiveness.

[Structure of Particulate Polymer]

The particulate polymer has a core-shell structure including a core portion and a shell portion that covers the outer surface of the core portion. However, the shell portion only partially covers the outer surface of the core portion. In other words, the shell portion of the particulate polymer covers the outer surface of the core portion but does not completely cover the outer surface of the core portion. In terms of external appearance, even in a situation in which the outer surface of the core portion appears to be completely covered by the shell portion, the shell portion is still considered to be a shell portion that partially covers the outer surface of the core portion so long as pores are formed that pass between inside and outside of the shell portion. Accordingly, a particulate polymer that, for example, includes a shell portion having fine pores that pass from the outer surface of the shell portion (i.e., a circumferential surface of the particulate polymer) to the outer surface of the core portion is also considered to be within the scope of the particulate polymer described above.

Specifically, as illustrated in an example of a cross-sectional structure of the particulate polymer in FIG. 1, the particulate polymer 100 has a core-shell structure including a core portion 110 and a shell portion 120. The core portion 110 is a portion of the particulate polymer 100 that is located further inward than the shell portion 120. The shell portion 120 is a portion of the particulate polymer 100 that covers an outer surface 110S of the core portion 110 and is normally an outermost portion of the particulate polymer 100. The shell portion 120 partially covers the outer surface 110S of the core portion 110, but does not completely cover the outer surface 110S of the core portion 110.

In the particulate polymer, the average percentage of the outer surface of the core portion that is covered by the shell portion (i.e., the coverage rate of the core portion) is preferably at least 10%, more preferably at least 40%, and even more preferably at least 55%, and is preferably no greater than 99%, more preferably no greater than 95%, even more preferably no greater than 85%, and particularly preferably no greater than 80%. As a result of the coverage rate being at least the lower limit of any of the aforementioned ranges, battery component blocking can be inhibited and adhesiveness between battery components in an electrolysis solution can be increased. Moreover, as a result of the coverage rate being no greater than the upper limit of any of the aforementioned ranges, a functional layer can be caused to display high ion diffusibility such that low-temperature output characteristics of a secondary battery can be improved, adhesiveness displayed by a functional layer upon heating before being immersed in an electrolysis solution can be further improved, and low-temperature shutdown characteristics can be improved.

The average percentage of the outer surface of the core portion that is covered by the shell portion can be measured through observation of a cross-sectional structure of the particulate polymer. Specifically, the average percentage can be measured by the following method.

First, the particulate polymer is sufficiently dispersed in a cold setting epoxy resin and is subsequently embedded to prepare a block containing the particulate polymer. Next, a measurement sample is prepared by cutting a flake of from 80 nm to 200 nm in thickness from the block using a microtome equipped with a diamond blade. Thereafter, the measurement sample may be dyed as necessary using ruthenium tetroxide, osmium tetroxide, or the like.

The measurement sample is then set in a transmission electron microscope (TEM) and an image of a cross-sectional structure of the particulate polymer is taken. The magnification of the electron microscope is preferably a magnification that allows the cross-section of one particle of the particulate polymer to fit within the visible field. Specifically, a magnification of approximately ×10,000 is preferable.

In the imaged cross-sectional structure of the particulate polymer, the length D1 of a circumference corresponding to the outer surface of the core portion and the length D2 of a section where the shell portion and the outer surface of the core portion are in contact are measured. The measured lengths D1 and D2 are used in the following formula (1) to calculate the percentage Rc of the outer surface of the core portion that is covered by the shell portion in the particulate polymer.

$$\text{Percentage coverage } Rc(\%) = (D2/D1) \times 100 \quad (1)$$

The percentage coverage Rc is measured for at least 20 particles of the particulate polymer and an average value thereof is calculated and is taken to be the average percentage of the outer surface of the core portion that is covered by the shell portion (i.e., the coverage rate).

Although the percentage coverage Rc can be calculated manually from the cross-sectional structure, it is also possible to calculate the percentage coverage Rc using commercially available image analysis software. One example of commercially available image analysis software that can be used is AnalySIS Pro (produced by Olympus Corporation).

The volume average particle diameter D50 of the particulate polymer is preferably at least 0.01 µm, more preferably at least 0.02 µm, and even more preferably at least 0.05 µm, and is preferably no greater than 10 µm, more preferably no greater than 5 µm, and even more preferably no greater than 1 µm. As a result of the volume average particle diameter D50 of the particulate polymer being at least the lower limit of any of the aforementioned ranges, an increase in internal resistance of a functional layer can be inhibited and low-temperature output characteristics of a secondary battery can be improved. Moreover, as a result of the volume average particle diameter D50 of the particulate polymer being no greater than the upper limit of any of the aforementioned ranges, adhesiveness between battery components in an electrolysis solution can be increased, high-temperature cycle characteristics of a secondary battery can be improved, adhesiveness displayed by a functional layer upon heating before immersion in an electrolysis solution can be improved, and low-temperature shutdown characteristics can be improved.

The "volume average particle diameter D50" of the particulate polymer in the present disclosure can be measured by a measurement method described in the EXAMPLES section of the present specification.

The particulate polymer may include optional elements other than the core portion and the shell portion described above so long as the desired effects are not significantly lost as a result. Specifically, the particulate polymer may, for example, include a portion inside of the core portion that is formed by a different polymer to the core portion. In one specific example, residual seed particles may be present inside of the core portion in a situation in which seed particles are used in production of the particulate polymer by seeded polymerization. However, from a viewpoint of more noticeably displaying the desired effects, it is preferable that the particulate polymer is composed by only the core portion and the shell portion.

—Core Portion—

The core portion of the particulate polymer is formed by a polymer that has a specific degree of swelling in an electrolysis solution. Specifically, the degree of swelling in electrolysis solution of the polymer of the core portion is required to be at least a factor of 5, and is preferably at least a factor of 10, and more preferably at least a factor of 15. Moreover, the degree of swelling in electrolysis solution of the polymer of the core portion is required to be no greater than a factor of 30, and is preferably no greater than a factor of 28, more preferably no greater than a factor of 25, and even more preferably no greater than a factor of 22. As a result of the degree of swelling in electrolysis solution of the polymer of the core portion being at least the lower limit of any of the aforementioned ranges, a functional layer can be caused to display high ion diffusibility, and low-temperature output characteristics of a secondary battery can be improved. Moreover, as a result of the degree of swelling in electrolysis solution of the polymer of the core portion being no greater than the upper limit of any of the aforementioned ranges, adhesiveness between battery components through an adhesive layer in an electrolysis solution can be increased and high-temperature cycle characteristics of a secondary battery can be improved.

The electrolysis solution used in order to measure the degree of swelling in electrolysis solution of the polymer of the core portion is a solution obtained by dissolving $LiPF_6$ as a supporting electrolyte with a concentration of 1 mol/L in a mixed solvent of ethylene carbonate, diethyl carbonate, and vinylene carbonate (ethylene carbonate/diethyl carbonate/vinylene carbonate (volume mixing ratio)=68.5/30/1.5; SP value 12.7 $(cal/cm^3)^{1/2}$).

Specifically, the degree of swelling in electrolysis solution of the polymer of the core portion can be measured as follows.

First, the polymer of the core portion in the particulate polymer is prepared. For example, a polymer may be prepared that is obtained through the same process as carried out in order to form the core portion in production of the particulate polymer. The prepared polymer is then used to produce a film. For example, in a situation in which the polymer is a solid, the polymer is dried for 48 hours at a temperature of 25° C. and is subsequently formed into a film shape to produce a film of 0.5 mm in thickness. Alternatively, in a situation in which the polymer is a dispersion liquid or solution, such as a latex, the dispersion liquid or solution may, for example, be added into a polytetrafluoroethylene petri dish and dried for 48 hours at a temperature of 25° C. to produce a film of 0.5 mm in thickness.

Next, a specimen is obtained by cutting a 1 cm square from the film produced as described above. The mass of the specimen is measured and is taken to be W0. The specimen is immersed in the electrolysis solution for 72 hours at a temperature of 60° C. and is then removed from the electrolysis solution. Electrolysis solution on the surface of the removed specimen is wiped off and the mass W1 of specimen after immersion is measured.

The mass W0 and the mass W1 are used to calculate the degree of swelling S (factor) according to S=W1/W0.

The degree of swelling in electrolysis solution of the polymer of the core portion can be adjusted, for example, by appropriately selecting, in consideration of the SP value of the electrolysis solution, the type and amount of each monomer used to produce the polymer of the core portion. In general, a polymer tends to swell more easily in an electrolysis solution when the SP value of the polymer is similar to the SP value of the electrolysis solution. Conversely, a polymer tends not to easily swell in an electrolysis solution when the SP value of the polymer differs significantly from the SP value of the electrolysis solution.

Note that the term "SP value" refers to the solubility parameter.

The SP value can be calculated by a method described in "Hansen Solubility Parameters: A User's Handbook, $2^{nd}$ Ed. (CRC Press)".

The SP value of an organic compound can be estimated from the molecular structure of the organic compound. Specifically, calculation may be performed using simulation software that can calculate an SP value from a SMILE formula (for example, "HSPiP" (http=//www.hansen-solubility.com)). This simulation software determines the SP value based on the theory described in "Hansen Solubility Parameters: A User's Handbook, $2^{nd}$ Ed., Charles M. Hansen".

Furthermore, the core portion of the particulate polymer is formed by a polymer that has a specific glass transition temperature. Specifically, the glass transition temperature of the polymer of the core portion is required to be at least −50° C., and is preferably at least −30° C., and more preferably at least 5° C. Moreover, the glass transition temperature of the polymer of the core portion is required to be no higher than 60° C., is preferably no higher than 55° C., and is more preferably no higher than 50° C. If the glass transition temperature of the polymer of the core portion is lower than −50° C., it may not be possible to sufficiently inhibit battery component blocking and it may not be possible to sufficiently increase adhesiveness between battery components through an adhesive layer in an electrolysis solution. Moreover, if the glass transition temperature of the polymer of the core portion is higher than 60° C., the improvement in adhesiveness displayed by a functional layer upon heating before immersion in an electrolysis solution may be insufficient and it may not be possible to sufficiently improve low-temperature shutdown characteristics.

Note that from a viewpoint of increasing fluidity and causing good adhesiveness to be displayed upon heating, particularly by the polymer of the core portion, and also from a viewpoint of maintaining a favorable core-shell structure of the particulate polymer, it is preferable that the glass transition temperature of the polymer of the core portion is lower than the glass transition temperature of the polymer of the shell portion described below. If the glass transition temperature of the polymer of the shell portion is not higher than the glass transition temperature of the polymer of the core portion, fluidity of the polymer of the shell portion may become excessively high upon heating and, as a result, it may become difficult to maintain the specific core-shell structure.

The glass transition temperature of the polymer of the core portion can be measured by a measurement method described in the EXAMPLES section of the present specification.

The glass transition temperature of the polymer of the core portion can be adjusted, for example, by appropriately selecting the type and amount of each monomer used to produce the polymer of the core portion in consideration of the glass transition temperature of a homopolymer of the monomer. For example, in the case of a (meth)acrylic acid ester monomer, the glass transition temperature of the resultant polymer tends to be lower when an alcohol derived portion of the (meth)acrylic acid ester monomer has a higher carbon number.

One or more monomers used to produce the polymer of the core portion are appropriately selected such that the degree of swelling in electrolysis solution and glass transition temperature of the polymer are within any of the aforementioned ranges. Examples of monomers such as described above include vinyl chloride-based monomers such as vinyl chloride and vinylidene chloride; vinyl acetate-based monomers such as vinyl acetate; aromatic vinyl monomers such as styrene, α-methylstyrene, styrene sulfonic acid, butoxystyrene, and vinylnaphthalene; vinylamine-based monomers such as vinylamine; vinylamide-based monomers such as N-vinylformamide and N-vinylacetamide; (meth)acrylic acid derivatives such as 2-hydroxyethyl methacrylate; (meth)acrylic acid ester monomers such as methyl acrylate, ethyl acrylate, butyl acrylate, methyl methacrylate, ethyl methacrylate, and 2-ethylhexyl acrylate; (meth)acrylamide monomers such as acrylamide and methacrylamide; (meth)acrylonitrile monomers such as acrylonitrile and methacrylonitrile; fluorine-containing (meth)acrylate monomers such as 2-(perfluorohexyl)ethyl methacrylate and 2-(perfluorobutyl)ethyl acrylate; maleimide; maleimide derivatives such as phenylmaleimide; and diene-based monomers such as 1,3-butadiene and isoprene. One of such monomers may be used individually, or two or more of such monomers may be used in combination in a freely selected ratio.

In the present disclosure, "(meth)acryl" is used to indicate "acryl" and/or "methacryl", and "(meth)acrylonitrile" is used to indicate "acrylonitrile" and/or "methacrylonitrile".

Of these monomers, (meth)acrylic acid ester monomers and (meth)acrylonitrile monomers are preferable, and (meth)acrylic acid ester monomers are more preferable as monomers used in production of the polymer of the core portion. In other words, the polymer of the core portion preferably includes a (meth)acrylic acid ester monomer unit and/or a (meth)acrylonitrile monomer unit, and more preferably includes a (meth)acrylic acid ester monomer unit. This facilitates control of the degree of swelling in electrolysis solution and the glass transition temperature of the polymer of the core portion and can further increase ion diffusibility of a functional layer in which the particulate polymer is used.

The polymer of the core portion may include an acid group-containing monomer unit. Examples of acid group-containing monomers that can be used include monomers that have an acid group such as carboxylic acid group-containing monomers, sulfonate group-containing monomers, phosphate group-containing monomers, and hydroxy group-containing monomers.

Examples of carboxylic acid group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfonate group-containing monomers include vinyl sulfonic acid, methyl vinyl sulfonic acid, (meth)allyl sulfonic acid, 2-sulfoethyl (meth)acrylate, 2-acrylamido-2-methylpropane sulfonic acid, and 3-allyloxy-2-hydroxypropane sulfonic acid.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Examples of hydroxy group-containing monomers include 2-hydroxyethyl acrylate, 2-hydroxypropyl acrylate, 2-hydroxyethyl methacrylate, and 2-hydroxypropyl methacrylate.

In the present disclosure, "(meth)allyl" is used to indicate "allyl" and/or "methallyl", and "(meth)acryloyl" is used to indicate "acryloyl" and/or "methacryloyl".

Of these monomers, carboxylic acid group-containing monomers are preferable, among which, monocarboxylic acids are preferable, and (meth)acrylic acid is more preferable as an acid group-containing monomer.

One acid group-containing monomer may be used individually, or two or more acid group-containing monomers may be used in combination in a freely selected ratio.

The proportion of the acid group-containing monomer unit in the polymer of the core portion is preferably at least 0.1 mass %, more preferably at least 1 mass %, and even more preferably at least 3 mass %, and is preferably no greater than 20 mass %, more preferably no greater than 10 mass %, and even more preferably no greater than 7 mass %. As a result of the proportion of the acid group-containing monomer unit being in any of the aforementioned ranges, it is possible to increase the dispersibility of the polymer of the core portion such that the shell portion partially covering the outer surface of the core portion can be more easily formed with respect to the outer surface of the polymer of the core portion in production of the particulate polymer.

The polymer of the core portion preferably includes a crosslinkable monomer unit in addition to the monomer units described above. The crosslinkable monomer is a monomer that can form a crosslinked structure during or after polymerization by heating or by irradiation with an energy beam. The degree of swelling in electrolysis solution of the polymer can be more easily controlled to within any of the aforementioned ranges through inclusion of the crosslinkable monomer unit.

Examples of crosslinkable monomers that can be used include polyfunctional monomers having at least two groups that display polymerization reactivity. Examples of polyfunctional monomers such as mentioned above include divinyl compounds such as divinyl benzene; di(meth)acrylic acid ester compounds such as ethylene dimethacrylate, diethylene glycol dimethacrylate, ethylene glycol dimethacrylate, diethylene glycol diacrylate, and 1,3-butylene glycol diacrylate; tri(meth)acrylic acid ester compounds such as trimethylolpropane trimethacrylate and trimethylolpropane triacrylate; and epoxy group-containing ethylenically unsaturated monomers such as allyl glycidyl ether and glycidyl methacrylate. Of these polyfunctional monomers, di(meth)acrylic acid ester compounds and epoxy group-containing ethylenically unsaturated monomers are preferable, di(meth)acrylic acid ester compounds are more preferable, and dimethacrylic acid ester compounds are even more preferable from a viewpoint of ease of control of the degree of swelling in electrolysis solution of the polymer of the core portion. One of such monomers may be used individually, or two or more of such monomers may be used in combination in a freely selected ratio.

In general, the degree of swelling in electrolysis solution of the polymer tends to decrease as the proportion of the crosslinkable monomer unit in the polymer increases. Accordingly, the proportion of the crosslinkable monomer unit is preferably set in consideration of the type and amount of each monomer that is used. More specifically, the proportion of the crosslinkable monomer unit in the polymer of the core portion is preferably at least 0.1 mass %, more preferably at least 0.2 mass %, and even more preferably at least 0.5 mass %, and is preferably no greater than 5 mass %, more preferably no greater than 4 mass %, and even more preferably no greater than 3 mass %. Adhesiveness of a functional layer can be increased through the proportion of the crosslinkable monomer unit being at least the lower limit of any of the aforementioned ranges. Moreover, cycle characteristics of a non-aqueous secondary battery can be improved through the proportion of the crosslinkable monomer unit being no greater than the upper limit of any of the aforementioned ranges.

—Shell Portion—

The shell portion of the particulate polymer is formed by a polymer having a specific degree of swelling in electrolysis solution that is smaller than the degree of swelling in electrolysis solution of the core portion. Specifically, the degree of swelling in electrolysis solution of the polymer of the shell portion is required to be greater than a factor of 1, and is preferably at least a factor of 1.05, more preferably at least a factor of 1.1, and even more preferably at least a factor of 1.2. Moreover, the degree of swelling in electrolysis solution of the polymer of the shell portion is required to be no greater than a factor of 4, and is preferably no greater than a factor of 3.5, and more preferably no greater than a factor of 3. As a result of the degree of swelling in electrolysis solution of the polymer of the shell portion being greater than the lower limit of any of the aforementioned ranges, a functional layer can be caused to display high ion diffusibility and low-temperature output characteristics of a secondary battery can be improved. Moreover, as a result of the degree of swelling in electrolysis solution of the polymer of the shell portion being no greater than the upper limit of any of the aforementioned ranges, adhesiveness between battery components through the functional layer in an electrolysis solution can be increased and high-temperature cycle characteristics of a secondary battery can be improved.

Herein, an electrolysis solution that is used in order to measure the degree of swelling in electrolysis solution of the polymer of the shell portion is the same as the electrolysis solution that is used in order to measure the degree of swelling in electrolysis solution of the polymer of the core portion.

Specifically, the degree of swelling in electrolysis solution of the polymer of the shell portion can be measured as follows.

First, the polymer of the shell portion of the particulate polymer is prepared. For example, a polymer is produced by the same method as for the core portion in production of the particulate polymer but using a monomer composition for formation of the shell portion instead of a monomer composition for formation of the core portion.

Thereafter, the same measurement method as for the degree of swelling in electrolysis solution of the polymer of the core portion is used in order to produce a film from the polymer of the shell portion, obtain a specimen from the produced film, and measure the degree of swelling S thereof.

The degree of swelling in electrolysis solution of the polymer of the shell portion can be adjusted, for example, by appropriately selecting, in consideration of the SP value of the electrolysis solution, the type and amount of each monomer used to produce the polymer of the shell portion.

Furthermore, the shell portion of the particulate polymer is formed by a polymer that has a specific glass transition temperature. Specifically, the glass transition temperature of the polymer of the shell portion is required to be at least 50° C., and is preferably at least 65° C., and more preferably at least 80° C. Moreover, the glass transition temperature of the polymer of the shell portion is required to be no higher than 200° C., and is preferably no higher than 150° C., and more preferably no higher than 110° C. If the glass transition temperature of the polymer of the shell portion is lower than 50° C., it may not be possible to sufficiently inhibit battery component blocking and it may not be possible to sufficiently increase adhesiveness between battery components in an electrolysis solution. Moreover, if the glass transition temperature of the polymer of the shell portion is higher than 200° C., the improvement in adhesiveness displayed by the functional layer upon heating before immersion in an electrolysis solution may be insufficient and it may not be possible to provide a secondary battery with good life characteristics. As previously explained, it is preferable that the glass transition temperature of the polymer of the shell portion is higher than the glass transition temperature of the polymer of the core portion from a viewpoint of favorably maintaining the core-shell structure of the particulate polymer after heating.

The glass transition temperature of the polymer of the shell portion can be measured by a measurement method described in the EXAMPLES section of the present specification.

The glass transition temperature of the polymer of the shell portion can be adjusted, for example, by appropriately selecting the type and amount of each monomer used to produce the polymer of the shell portion in consideration of the glass transition temperature of a homopolymer of the monomer.

One or more monomers used to produce the polymer of the shell portion are appropriately selected such that the degree of swelling in electrolysis solution and glass transition temperature of the polymer are within any of the aforementioned ranges. Examples of monomers that can be used include the same monomers as provided as examples of monomers that can be used to produce the polymer of the core portion. One of such monomers may be used individually, or two or more of such monomers may be used in combination in a freely selected ratio.

Of these monomers, it is preferable that an aromatic vinyl monomer is used as a monomer in production of the polymer of the shell portion. In other words, the polymer of the shell portion preferably includes an aromatic vinyl monomer unit. Among aromatic vinyl monomers, styrene derivatives such as styrene and styrene sulfonic acid are more preferable. The degree of swelling in electrolysis solution of the polymer can be controlled more easily through use of an aromatic vinyl monomer. Adhesiveness of a functional layer can also be further improved.

The proportion of the aromatic vinyl monomer unit in the polymer of the shell portion is preferably at least 20 mass %, more preferably at least 40 mass %, even more preferably at least 50 mass %, further preferably at least 60 mass %, and particularly preferably at least 80 mass %, and is preferably no greater than 100 mass %, more preferably no greater than 99.5 mass %, and even more preferably no greater than 99 mass %. As a result of the proportion of the aromatic vinyl monomer unit being within any of the aforementioned ranges, the degree of swelling in electrolysis solution of the polymer of the shell portion can be more easily controlled to within any of the aforementioned ranges and the glass transition temperature of the polymer of the shell portion can be more easily controlled to within any of the aforementioned ranges. Moreover, adhesive strength of a functional layer in an electrolysis solution can be further increased.

Besides the aromatic vinyl monomer unit, the polymer of the shell portion may contain an acid group-containing monomer unit. Examples of acid group-containing monomers that can be used include monomers that have an acid group such as carboxylic acid group-containing monomers, sulfonate group-containing monomers, phosphate group-containing monomers, and hydroxy group-containing monomers. Specific examples of acid group-containing monomers that can be used include the same acid group-containing monomers as can be used for the core portion.

Of these monomers, carboxylic acid group-containing monomers are preferable, among which, monocarboxylic acids are more preferable, and (meth)acrylic acid is even more preferable as an acid group-containing monomer.

One acid group-containing monomer may be used individually, or two or more acid group-containing monomers may be used in combination in a freely selected ratio.

The proportion of the acid group-containing monomer unit in the polymer of the shell portion is preferably at least 0.1 mass %, more preferably at least 1 mass %, and even more preferably at least 3 mass %, and is preferably no greater than 20 mass %, more preferably no greater than 10 mass %, and even more preferably no greater than 7 mass %. As a result of the proportion of the acid group-containing monomer unit being within any of the aforementioned ranges, dispersibility of the particulate polymer in a functional layer can be improved such that good adhesiveness can be displayed across the entire surface of the functional layer.

The polymer of the shell portion may include a crosslinkable monomer unit. Examples of crosslinkable monomers that can be used include the same monomers as given as examples of crosslinkable monomers that can be used in the polymer of the core portion. One crosslinkable monomer may be used individually, or two or more crosslinkable monomers may be used in combination in a freely selected ratio.

The proportion of the crosslinkable monomer unit in the polymer of the shell portion is preferably at least 0.1 mass %, more preferably at least 0.2 mass %, and even more preferably at least 0.5 mass %, and is preferably no greater than 5 mass %, more preferably no greater than 4 mass %, and even more preferably no greater than 3 mass %.

The shell portion preferably has an average thickness that is within a specific range relative to the volume average particle diameter D50 of the particulate polymer. Specifically, the average thickness of the shell portion relative to the volume average particle diameter D50 of the particulate polymer (i.e., the core-shell ratio) is preferably at least 1%, more preferably at least 3%, and even more preferably at least 5%, and is preferably no greater than 30%, more preferably no greater than 25%, and even more preferably no greater than 20%. As a result of the average thickness of the shell portion being at least the lower limit of any of the aforementioned ranges, adhesiveness of a functional layer in an electrolysis solution can be further increased. Moreover, as a result of the average thickness of the shell portion being no greater than the upper limit of any of the aforementioned ranges, low-temperature output characteristics of a secondary battery can be further improved.

The average thickness of the shell portion can be determined through observation of a cross-sectional structure of the particulate polymer using a transmission electron microscope (TEM). Specifically, the TEM is used to measure the maximum thickness of the shell portion in the cross-sectional structure of the particulate polymer and an average value of maximum thicknesses of the shell portion for 20 randomly selected particles of the particulate polymer is taken to be the average thickness of the shell portion. Note that in a situation in which the shell portion is composed by particles of a polymer and is formed by a single layer of the polymer particles in which the particles forming the shell portion do not overlap in a radial direction of the particulate polymer, the average thickness of the shell portion is taken to be the number average particle diameter of the particles forming the shell portion.

Although no specific limitations are placed on the form of the shell portion, the shell portion is preferably formed by particles of a polymer. In a situation in which the shell portion is formed by polymer particles, a plurality of the particles forming the shell portion may overlap in the radial direction of the particulate polymer. However, it is preferable that the shell portion is formed by a single layer of the polymer particles in which the particles forming the shell portion do not overlap in the radial direction of the particulate polymer.

[Production Method of Particulate Polymer]

The particulate polymer having the core-shell structure described above can be produced, for example, by stepwise polymerization in which the ratio of one or more monomers for the polymer of the core portion and one or more monomers for the polymer of the shell portion is changed over time. Specifically, the particulate polymer can be produced by continuous, multi-step emulsion polymerization or multi-step suspension polymerization in which a polymer formed in a preceding step is then covered by a polymer formed in a succeeding step.

The following describes one example of a case in which the particulate polymer having the core-shell structure is obtained by multi-step emulsion polymerization.

In the polymerization, an anionic surfactant such as sodium dodecylbenzenesulfonate or sodium dodecyl sulfate, a non-ionic surfactant such as polyoxyethylene nonylphenyl ether or sorbitan monolaurate, or a cationic surfactant such as octadecylamine acetate may be used as an emulsifier in accordance with a standard method. Moreover, a peroxide such as t-butyl peroxy-2-ethylhexanoate, potassium persulfate, or cumene peroxide or an azo compound such as 2,2'-azobis(2-methyl-N-(2-hydroxyethyl)propionamide) or 2,2'-azobis(2-amidinopropane) hydrochloride may be used as a polymerization initiator.

The polymerization procedure involves initially mixing one or more monomers for forming the core portion and the emulsifier, and then performing emulsion polymerization at once to obtain the polymer forming the core portion in the form of particles. The particulate polymer having the core-shell structure described above can then be obtained by performing polymerization of one or more monomers for forming the shell portion in the presence of the polymer forming the core portion, which is in form of particles.

In this polymerization, it is preferable that the monomers for forming the polymer of the shell portion are supplied continuously into the polymerization system or divided into a plurality of portions from a viewpoint of partially covering the outer surface of the core portion with the shell portion. As a result of the monomers for forming the polymer of the shell portion being supplied into the polymerization system in portions or continuously, the polymer forming the shell portion can be formed as particles that bond to the core portion such as to form the shell portion partially covering the core portion.

Note that in a situation in which the monomers for forming the polymer of the shell portion are supplied in a plurality of portions, the average thickness of the shell portion can be controlled in accordance with the proportion in which the monomers are divided into portions. Moreover, in a situation in which the monomers for forming the polymer of the shell portion are supplied continuously, the average thickness of the shell portion can be controlled by adjusting the amount of the monomers that is supplied per unit time.

The volume average particle diameter D50 of the particulate polymer after the shell portion has been formed can be kept within a target range by, for example, adjusting the amount of the emulsifier and the amounts of the monomers. Furthermore, the average percentage of the outer surface of the core portion that is covered by the shell portion (i.e., the coverage rate) can be kept within a target range by, for example, adjusting the amount of the emulsifier and the amounts of the monomers for forming the polymer of the shell portion.

<Binder for Functional Layer>

As explained above, when the particulate polymer is in a state in which it is not swollen in an electrolysis solution and is not heated, the particulate polymer does not normally display adhesiveness. Therefore, in order to inhibit the particulate polymer from becoming detached from the functional layer straight after formation of the functional layer (i.e., before heating or immersion in an electrolysis solution), it is preferable that the composition for a functional layer contains a binder for a functional layer that displays adhesiveness even in a state in which it is not swollen in an electrolysis solution and is not heated. Through use of the binder for a functional layer, it is possible to inhibit components such as the particulate polymer from becoming detached from the functional layer even when not in a swollen state in an electrolysis solution and not in a heated state.

The binder for a functional layer that can be used in combination with the particulate polymer may be a known binder, such as a thermoplastic elastomer, that is water-insoluble and that can be dispersed in a dispersion medium such as water. The thermoplastic elastomer is preferably a conjugated diene-based polymer or an acrylic polymer, and is more preferably an acrylic polymer.

The conjugated diene-based polymer is a polymer that includes a conjugated diene monomer unit and specific examples thereof include a polymer including an aromatic vinyl monomer unit and an aliphatic conjugated diene monomer unit, such as a styrene-butadiene copolymer (SBR), and an acrylic rubber (NBR) (polymer including an acrylonitrile unit and a butadiene unit). The acrylic polymer is a polymer that includes a (meth)acrylic acid ester monomer unit. Examples of (meth)acrylic acid ester monomers that can be used to form the (meth)acrylic acid ester monomer unit include the same (meth)acrylic acid ester monomers as can be used to produce the polymer of the core portion of the particulate polymer.

One of such binders for a functional layer may be used individually, or two or more of such binders for a functional layer may be used in combination. However, in a situation in which two or more binders for a functional layer are combined, polymers used as these binders for a functional layer are different from the particulate polymer having the core-shell structure formed by the specific polymers described above.

The acrylic polymer that may be used as a binder for a functional layer preferably includes a (meth)acrylonitrile monomer unit. As a result, the strength of a functional layer can be increased.

In the acrylic polymer that may be used as a binder for a functional layer, the amount of the (meth)acrylonitrile monomer unit as a proportion relative to the total amount of the (meth)acrylonitrile monomer unit and the (meth)acrylic acid ester monomer unit is preferably at least 1 mass %, and more preferably at least 2 mass %, and is preferably no greater than 30 mass %, and more preferably no greater than 25 mass %. As a result of the proportion of the (meth)acrylonitrile monomer unit being at least the lower limit of any of the aforementioned ranges, the strength of the acrylic polymer as a binder for a functional layer can be increased, and thus the strength of a functional layer in which the acrylic polymer is used can be increased. Moreover, as a result of the proportion of the (meth)acrylonitrile monomer unit being no greater than the upper limit of any of the aforementioned ranges, the acrylic polymer used as a binder for a functional layer displays an appropriate degree of swelling in an electrolysis solution, which can inhibit a decrease of ion conductivity of a functional layer and deterioration of low-temperature output characteristics of a secondary battery.

The glass transition temperature of the binder for a functional layer is preferably at least −100° C., more preferably at least −90° C., and even more preferably at least −80° C., and is preferably no higher than 0° C., more preferably no higher than −5° C., and even more preferably no higher than −10° C. As a result of the glass transition temperature of the binder for a functional layer being at least the lower limit of any of the aforementioned ranges, adhesiveness and strength of the binder for a functional layer can be increased. Moreover, as a result of the glass transition temperature of the binder for a functional layer being no greater than the upper limit of any of the aforementioned ranges, flexibility of a functional layer can be increased.

The volume average particle diameter D50 of the binder for a functional layer is preferably at least 0.1 μm and no greater than 0.5 μm. As a result of the volume average particle diameter D50 of the binder for a functional layer being at least the lower limit of the aforementioned range, dispersibility of the binder for a functional layer can be increased. Moreover, as a result of the volume average particle diameter D50 being no greater than the upper limit of the aforementioned range, adhesiveness of the binder for a functional layer can be increased.

The content of the binder for a functional layer in the composition for a functional layer relative to 100 parts by mass of the previously described particulate polymer is preferably at least 1 part by mass, more preferably at least 5 parts by mass, and even more preferably at least 10 parts by mass, and is preferably no greater than 30 parts by mass, more preferably no greater than 25 parts by mass, and even more preferably no greater than 20 parts by mass. As a result of the content of the binder for a functional layer being at least the lower limit of any of the aforementioned ranges, the particulate polymer can be sufficiently prevented from becoming detached from a functional layer before heating or immersion in an electrolysis solution. Moreover, as a result of the content of the binder for a functional layer being no greater than the upper limit of any of the aforementioned ranges, a decrease in ion diffusibility of a functional layer can be inhibited.

Examples of methods by which the binder for a functional layer can be produced include solution polymerization, suspension polymerization, and emulsion polymerization. Of these methods, suspension polymerization and emulsion polymerization are preferable in terms that polymerization can be carried out in water and an aqueous dispersion containing the binder for a functional layer in the form of particles can be suitably used, as produced, as a material for the composition for a functional layer. In production of the polymer used as the binder for a functional layer, it is preferable that a dispersant is present in the reaction system. In general, the binder for a functional layer is substantially composed by the constituent polymer thereof, but may also be accompanied by other optional components such as an additive used in polymerization.

<Non-Conductive Particles>

In a situation in which the functional layer also functions as a porous membrane layer, the composition for a functional layer may contain non-conductive particles. The non-conductive particles contained in the composition for a functional layer are not specifically limited and may, for example, be known non-conductive particles that are used in non-aqueous secondary batteries.

Specifically, although inorganic fine particles and organic fine particles other than the particulate polymer and the binder for a functional layer described above can both be used as the non-conductive particles, inorganic fine particles are normally used. Of such particles, non-conductive particles formed by a material that is present stably in a usage environment of a non-aqueous secondary battery and that is electrochemically stable are preferable. In consideration of the above, preferable examples of the material of the non-conductive particles include particles of oxides such as aluminum oxide (alumina), hydrous aluminum oxide (Boehmite), silicon oxide, magnesium oxide (magnesia), calcium oxide, titanium oxide (titania), $BaTiO_3$, ZrO, and alumina-silica composite oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, or the like as necessary.

One type of such non-conductive particles may be used individually, or two or more types of such non-conductive particles may be used in combination.

<Other Components>

The composition for a non-aqueous secondary battery functional layer may contain other optional components besides the components described above. Commonly known examples of such other components can be used without any specific limitations so long as the battery reactions are not affected. One of such other components may be used individually, or two or more of such other components may be used in combination.

Examples of these other components include known additives such as viscosity modifiers, additives for electrolysis solution, and wetting agents such as an ethylene oxide-propylene oxide copolymer.

<Production of Composition for Non-Aqueous Secondary Battery Functional Layer>

Although no specific limitations are placed on the method by which the composition for a functional layer is produced, the composition for a functional layer is normally produced by mixing the particulate polymer and water as a dispersion medium, and additionally mixing the binder for a functional layer, the non-conductive particles, and the other components as necessary. No specific limitations are placed on the mixing method. However, the mixing is normally carried out using a disperser as a mixing device in order to efficiently disperse the components.

The disperser is preferably a device that enables homogeneous dispersion and mixing of the components. Examples of the disperser include a ball mill, a sand mill, a pigment disperser, a grinding machine, an ultrasonic disperser, a homogenizer, and a planetary mixer. Moreover, high-level dispersing devices such as a bead mill, a roll mill, and a FILMIX may be used in view of their ability to apply high dispersing shear force.

(Functional Layer-Equipped Substrate for Non-Aqueous Secondary Battery)

A functional layer for a non-aqueous secondary battery can be formed on an appropriate substrate using the composition for a non-aqueous secondary battery functional layer described above. A functional layer-equipped substrate for a non-aqueous secondary battery is obtained through formation of the functional layer on the substrate. The functional layer for a non-aqueous secondary battery that is formed on the substrate can provide a battery component with high blocking resistance, can display excellent adhesiveness both before and after immersion in an electrolysis solution, and can cause a non-aqueous secondary battery to display excellent battery characteristics (high-temperature cycle characteristics and low-temperature output characteristics).

<Substrate>

No specific limitations are placed on the substrate on which the functional layer is formed. For example, in a situation in which the functional layer is used as a component that constitutes part of a separator, a separator substrate may be used as the substrate, and in a situation in which the functional layer is used as a component that constitutes part of an electrode, an electrode substrate obtained by forming an electrode mixed material layer on a current collector may be used as the substrate. Moreover, no specific limitations are placed on the method of use of the functional layer-equipped substrate obtained by forming the functional layer on the substrate using the composition for a non-aqueous secondary battery functional layer. For example, the functional layer may be formed on a separator substrate or the like and then be used in this form as a battery component such as a separator, may be formed on an electrode substrate and then be used in this form as an electrode, or may be formed on a detachable substrate, and then be peeled off the detachable substrate and applied onto another substrate in order to be used as a battery component.

However, from a viewpoint of raising battery component production efficiency by omitting a step of peeling the functional layer from a detachable substrate, it is preferable that a separator substrate or an electrode substrate is used as the substrate and that the functional layer-equipped substrate is used as a battery component as produced. As a result of the functional layer formed on the separator substrate or the electrode substrate containing the particulate polymer described above, the functional layer can display blocking resistance and can also display adhesiveness upon heating thereof such as to inhibit the occurrence of a winding deviation in a situation in which battery components are laminated and wound with the functional layer in-between. Moreover, the functional layer can display excellent adhesiveness in an electrolysis solution and can improve battery characteristics of a secondary battery.

[Separator Substrate]

The separator substrate on which the functional layer may be formed is not specifically limited and a separator substrate such as described in JP 2012-204303 A may be used. Of these separators, a fine porous membrane made of a polyolefinic (for example, polyethylene, polypropylene, polybutene, or polyvinyl chloride) resin is preferred because such a membrane can reduce the total thickness of the separator, which can increase the capacity per unit volume of a secondary battery by increasing the ratio of an electrode active material in the secondary battery.

Note that an optional layer having a desired function, other than the aforementioned functional layer, may constitute part of the separator substrate.

[Electrode Substrate]

The electrode substrate (positive/negative electrode substrate) on which the functional layer may be formed is not specifically limited and may, for example, be an electrode substrate obtained by forming an electrode mixed material layer on a current collector.

Herein, the current collector, components in the electrode mixed material layer (for example, an electrode active material (positive/negative electrode active material) and a binder for an electrode mixed material layer (binder for a positive/negative electrode mixed material layer)), and the method by which the electrode mixed material layer is formed on the current collector may be known examples thereof such as described, for example, in JP 2013-145763 A.

Note that an optional layer having a desired function, other than the aforementioned functional layer, may constitute part of the electrode substrate.

[Detachable Substrate]

The detachable substrate on which the functional layer may be formed is not specifically limited and may be a known detachable substrate.

<Formation Method of Functional Layer for Non-Aqueous Secondary Battery>

The method by which the functional layer is formed on a substrate described above, such as a separator substrate or an electrode substrate, may for example be:

1) A method in which the composition for a functional layer is applied onto the surface of a separator substrate or an electrode substrate (a surface at an electrode mixed material layer side in the case of an electrode substrate; the same also applies below) and is then dried;
2) A method in which a separator substrate or an electrode substrate is immersed in the composition for a functional layer and the resultant product is then dried; or
3) A method in which the composition for a functional layer is applied onto a detachable substrate and is dried to produce a functional layer that is then transferred onto the surface of a separator substrate or an electrode substrate.

Of these methods, the method described in 1) is particularly preferable since it allows the thickness of the functional layer to be easily controlled. The method described in 1) more specifically includes a step of applying the composition for a functional layer onto a separator substrate or an electrode substrate (application step) and a step of drying the applied composition for a functional layer on the separator substrate or the electrode substrate to form a functional layer (drying step).

No specific limitations are placed on the method by which the composition for a functional layer is applied onto the separator substrate or the electrode substrate in the application step. For example, a method such as spray coating, doctor blading, reverse roll coating, direct roll coating, gravure coating, extrusion coating, or brush coating may be used. Of these methods, spray coating and gravure coating are preferable in terms of allowing formation of a thinner functional layer.

The composition for a functional layer that has been applied onto the substrate may be dried by any commonly known method in the drying step without any specific limitations. For example, drying may be carried out through drying by warm, hot, or low-humidity air; drying in a vacuum; or drying by irradiation with infrared light or electron beams. Although no specific limitations are placed on the drying conditions, the drying temperature is preferably from 30° C. to 80° C. and the drying time is preferably from 30 seconds to 10 minutes.

The thickness of the functional layer formed on the substrate is preferably at least 0.01 µm, more preferably at least 0.1 µm, and even more preferably at least 0.5 µm, and is preferably no greater than 20 µm, more preferably no greater than 10 µm, and even more preferably no greater than 5 µm. Sufficient strength of the functional layer can be ensured through the thickness of the functional layer being at least the lower limit of any of the aforementioned ranges, and ion diffusibility of the functional layer can be ensured and low-temperature output characteristics of a secondary battery can be further improved through the thickness of the functional layer being no greater than the upper limit of any of the aforementioned ranges.

(Production Method of Laminate for Non-Aqueous Secondary Battery)

A laminate for a non-aqueous secondary battery is obtained by laminating a separator substrate, a functional layer formed using the composition for a non-aqueous secondary battery functional layer, and an electrode substrate. In the laminate for a non-aqueous secondary battery, the separator substrate and the electrode substrate are adhered through the functional layer. In other words, the laminate for a non-aqueous secondary battery can be used in a secondary battery as a component in which a separator and an electrode are adhered through a functional layer. A method for producing the laminate for a non-aqueous secondary battery includes a laminating step of laminating the separator substrate and the electrode substrate with the functional layer in-between and an adhering step of heating the functional layer after the laminating step such as to cause adhesion, through the functional layer, of the separator substrate and the electrode substrate that have been laminated. Through the method described above, it is possible to produce a laminate for a non-aqueous secondary battery in which a separator substrate and an electrode substrate are strongly adhered both before and after immersion in an electrolysis solution.

It should be noted that so long as the laminate for a non-aqueous secondary battery has a structure in which a separator substrate and an electrode substrate are adhered through a functional layer, the laminate for a non-aqueous secondary battery is not limited to including only one separator substrate, one functional layer, and one electrode substrate. In other words, the laminate for a non-aqueous secondary battery may, for example, be a laminate in which an electrode substrate (positive electrode substrate), a functional layer, a separator substrate, a functional layer, and an electrode substrate (negative electrode substrate) are laminated in order.

<Functional Layer Formed Using Composition for Non-Aqueous Secondary Battery Functional Layer>

The functional layer used in the presently disclosed method for producing a laminate for a non-aqueous secondary battery is formed using the composition for a non-aqueous secondary battery functional layer. In terms of ease of production of the laminate, it is preferable that the functional layer is formed on the separator substrate or electrode substrate adhered through the functional layer. In other words, in the presently disclosed method for producing a laminate for a non-aqueous secondary battery, it is preferable to use a functional layer-equipped substrate in which the separator substrate or the electrode substrate is used as a substrate.

Note that the separator substrate and the electrode substrate may be the same as previously described and the method by which the functional layer is formed on the substrate using the composition for a functional layer may be any of the previously described methods.

<Laminating Step>

The laminating step involves laminating the separator substrate and the electrode substrate with the functional layer in an interposed state between the separator substrate and the electrode substrate. Specifically, the laminating step may involve, for example, laminating a separator substrate that has a functional layer formed on the surface thereof and an electrode substrate that does not have a functional layer such that the functional layer becomes positioned between the separator substrate and the electrode substrate. Alternatively, the laminating step may involve, for example, laminating an electrode substrate that has a functional layer formed on the surface thereof and a separator substrate that does not have a functional layer such that the functional layer becomes positioned between the separator substrate and the electrode substrate. As a result, the separator substrate and the electrode substrate are positioned adjacently with the functional layer in-between. The laminating step may alternatively be carried out by positioning an individual functional layer that is not formed on a substrate between a separator substrate that does not have a functional layer and an electrode substrate that does not have a functional layer. Moreover, the laminating step may be carried out by laminating an electrode substrate that has a functional layer formed on the surface thereof and a separator substrate that has a functional layer formed on the surface thereof. As explained above, no specific limitations are placed on the number of electrode substrates, functional layers, and separator substrates that are laminated in the laminating step. For example, the laminating step may be carried out by laminating an electrode substrate (positive electrode substrate), a functional layer, a separator substrate, a functional layer, and an electrode substrate (negative electrode substrate) in order.

Known methods can be adopted in order to laminate the electrode substrate or the separator substrate without any specific limitations.

<Adhering Step>

In the presently disclosed method for producing a laminate for a non-aqueous secondary battery, the functional layer is heated after the laminating step such as to cause adhesion, through the functional layer, of the separator substrate and the electrode substrate (adhering step). In the heating, the functional layer may be heated individually or may be heated by collectively heating the laminated separator substrate, functional layer, and electrode substrate. The method by which heating is performed is not specifically limited and may be a known method.

Although no specific limitations are placed on the conditions under which the functional layer is heated, the temperature to which the functional layer is heated is preferably from 40° C. to 100° C. and the time for which the functional layer is heated is preferably from 1 second to 5 minutes. In a situation in which the laminated separator substrate, functional layer, and electrode substrate are collectively heated, pressing thereof may be carried out at a pressure that is preferably at least 0.1 MPa and no greater than 30 MPa.

In a situation in which the glass transition temperature of the polymer forming the core portion of the particulate polymer is lower than the glass transition temperature of the polymer forming the shell portion of the particulate polymer, the temperature to which the functional layer is heated in the adhering step is preferably at least as high as the glass transition temperature of the polymer of the core portion of the particulate polymer contained in the functional layer and lower than the glass transition temperature of the polymer of the shell portion of the particulate polymer. As a result of the heating temperature in the adhering step being at least as high as the glass transition temperature of the polymer of the core portion of the particulate polymer contained in the functional layer, the polymer forming the core portion can flow more easily and adhesiveness before immersion in an electrolysis solution can be further improved. Consequently, the occurrence of a winding deviation of the laminate can be inhibited. Moreover, as a result of the heating temperature in the adhering step being lower than the glass transition temperature of the shell portion of the particulate polymer, excessive fluidity of the shell portion during heating can be prevented and the core-shell structure can be favorably maintained. Furthermore, upon immersion of the functional layer in an electrolysis solution, the polymer forming the shell portion can swell more reliably such as to cause strong adhesion between the separator substrate and the electrode substrate in the electrolysis solution.

It is assumed that the polymers forming the particulate polymer become more fluid and display adhesiveness as described above upon heating of the functional layer. However, it is also assumed that since the heating time is relatively short and sufficient adhesiveness can be displayed through increased fluidity of just a small amount of polymer, it is possible to maintain the specific core-shell structure of the particulate polymer in the functional layer even after heating (i.e., a situation in which the shell portion completely covers the surface of the core portion or in which the shell portion becomes covered by the polymer of the core portion due to increased fluidity thereof does not occur).

(Non-Aqueous Secondary Battery)

The presently disclosed non-aqueous secondary battery includes a laminate for a non-aqueous secondary battery that is produced by the method for producing a laminate for a non-aqueous secondary battery described above. Specifically, the presently disclosed non-aqueous secondary battery includes, for example, a positive electrode, a negative electrode, a separator, and an electrolysis solution, wherein the positive electrode and the separator and/or the negative electrode and the separator are adhered through a functional layer. The previously described laminate for a non-aqueous secondary battery may be used in the presently disclosed non-aqueous secondary battery as a positive electrode and separator that are adhered through a functional layer and/or a negative electrode and separator that are adhered through a functional layer. The presently disclosed non-aqueous secondary battery includes a laminate for a non-aqueous secondary battery including a functional layer that is formed using the presently disclosed composition for a non-aqueous secondary battery functional layer. As a result, the presently disclosed non-aqueous secondary battery has excellent battery characteristics such as high-temperature cycle characteristics and low-temperature output characteristics due to the functional layer enabling strong adhesion between a separator substrate and an electrode substrate in the electrolysis solution. Moreover, since a laminate for a non-aqueous secondary battery produced by the presently disclosed method for producing a laminate for a non-aqueous secondary battery is used in the presently disclosed non-aqueous secondary battery, the presently disclosed non-aqueous secondary battery can be easily produced while inhibiting the occurrence of problems such as a winding deviation.

In a situation in which a positive electrode, negative electrode, separator, or the like other than the previously described laminate for a non-aqueous secondary battery is used in the non-aqueous secondary battery (for example, in a situation in which the secondary battery is formed using a negative electrode and a laminate in which a positive electrode substrate and a separator substrate are adhered through a functional layer), the positive electrode, negative electrode, or separator may be a known positive electrode, negative electrode, or separator for use in non-aqueous secondary batteries. The electrolysis solution may be a known electrolysis solution for use in non-aqueous secondary batteries.

An electrode (positive/negative electrode) that is used other than the previously described laminate for a non-aqueous secondary battery may specifically be an electrode substrate such as described above, and a separator that is used other than the previously described laminate for a non-aqueous secondary battery may specifically be a separator substrate such as described above.

The electrolysis solution is normally an organic electrolysis solution obtained by dissolving a supporting electrolyte in an organic solvent. In a situation in which the non-aqueous secondary battery is, for example, a lithium ion secondary battery, the supporting electrolyte is a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation, and $LiPF_6$ is particularly preferable. One supporting electrolyte may be used individually, or two or more supporting electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolysis solution is not specifically limited so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of such solvents may be used. Of these solvents, carbonates are preferable due to having a high permittivity and a wide stable potential region, and a mixture of ethylene carbonate and ethyl methyl carbonate is more preferable.

The concentration of the supporting electrolyte in the electrolysis solution may be adjusted as appropriate and is, for example, preferably from 0.5 mass % to 15 mass %, more preferably from 2 mass % to 13 mass %, and even more preferably from 5 mass % to 10 mass %. Known additives such as fluoroethylene carbonate and ethyl methyl sulfone may be added to the electrolysis solution.

(Production Method of Non-Aqueous Secondary Battery)

The non-aqueous secondary battery is produced, for example, by rolling or folding, in accordance with the battery shape, a laminate for a non-aqueous secondary battery produced by the presently disclosed method for producing a laminate for a non-aqueous secondary battery described above, placing the laminate in a battery container, filling the battery container with the electrolysis solution, and sealing the battery container. Alternatively, the non-aqueous secondary battery may be produced, for example, by rolling or folding, in accordance with the battery shape, a product obtained by laminating the laminate for a non-aqueous secondary battery and a positive electrode, negative electrode, and/or separator other than the laminate for a non-aqueous secondary battery, placing the obtained product in a battery container, filling the battery container with the electrolysis solution, and sealing the battery container. In order to prevent pressure increase inside the non-aqueous secondary battery and occurrence of overcharging or overdischarging, an overcurrent preventing device such as a fuse or a PTC device; an expanded metal; or a lead plate may be provided as necessary. The shape of the non-aqueous secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion of a structural unit in the polymer that is formed through polymerization of a given monomer is normally, unless otherwise specified, the same as the ratio (charging ratio) of the given monomer among all monomers used in polymerization of the polymer.

In the examples and comparative examples, the following methods were used to measure and evaluate the glass transition temperature and degree of swelling in electrolysis solution of a polymer of a core portion and a polymer of a shell portion, the glass transition temperature of a binder for a functional layer, the volume average particle diameter D50 of a particulate polymer and a binder for a functional layer, the core-shell ratio and coverage rate of a particulate polymer, the adhesiveness between an electrode substrate and a separator substrate before and after immersion in an electrolysis solution, the blocking resistance of a functional layer-equipped substrate, the high-temperature cycle characteristics and low-temperature output characteristics of a secondary battery, and the low-temperature shutdown characteristics of a functional layer.

<Glass Transition Temperature of Polymer of Core Portion, Polymer of Shell Portion, and Binder for Functional Layer>

With respect to each of a core portion and a shell portion of a particulate polymer, monomers, additives, and so forth used to form the core portion or shell portion were used to prepare an aqueous dispersion containing a polymer (polymer of the core portion or polymer of the shell portion) through the same polymerization conditions as used for the core portion or shell portion. Each of the prepared aqueous dispersions was used as a measurement sample. An aqueous dispersion containing a binder for a functional layer was also prepared as a measurement sample.

Next, a dried measurement sample was weighed into an aluminum pan in an amount of 10 mg and a differential themoanalyzer (produced by SII Technology, product name: EXSTAR DSC6220) was used to measure a DSC curve with respect to the measurement sample under normal temperature and humidity with a measurement temperature range of from −100° C. to 500° C. and a heating rate of 10° C./minute, and using an empty aluminum pan as a reference. The glass transition temperature was determined from an intersection point of a base line directly before a heat absorption peak on the DSC curve at which a derivative signal (DDSC) was at least 0.05 mW/minute/mg in a heating process and a tangent to the DSC curve at a first inflection point to appear after the heat absorption peak.

<Degree of Swelling in Electrolysis Solution of Polymer of Core Portion and Polymer of Shell Portion>

With respect to each of a core portion and a shell portion of a particulate polymer, monomers, additives, and so forth used to form the core portion or shell portion were used to prepare an aqueous dispersion containing a polymer of the core portion or a polymer of the shell portion through the same polymerization conditions as used for the core portion or the shell portion. The aqueous dispersion was poured into a polytetrafluoroethylene petri dish and was dried for 48 hours at 25° C. to obtain a film of 0.5 mm in thickness. A specimen was obtained by cutting a 1 cm square from the obtained film. The mass W0 of the specimen was measured. The specimen was then immersed in an electrolysis solution for 72 hours at 60° C. Thereafter, the specimen was removed from the electrolysis solution, electrolysis solution on the surface of the specimen was wiped off, and the mass W1 of the specimen after immersion was measured. The mass W0 and the mass W1 were used to calculate the degree of swelling in electrolysis solution S (factor) according to S=W1/W0.

The electrolysis solution was obtained by dissolving $LiPF_6$ as a supporting electrolyte in a mixed solvent of ethylene carbonate, diethyl carbonate, and vinylene carbonate (ethylene carbonate/diethyl carbonate/vinylene carbonate (volume mixing ratio)=68.5/30/1.5; SP value 12.7 (cal/$cm^3)^{1/2}$) such that the $LiPF_6$ had a concentration of 1 mol/L relative to the solvent.

<Volume Average Particle Diameter D50 of Particulate Polymer and Binder for Functional Layer>

With respect to each of a particulate polymer and a binder for a functional layer, the volume average particle diameter D50 thereof was taken to be a particle diameter at which, in a particle diameter distribution measured by a laser diffraction particle diameter distribution measurement device (SALD-3100 produced by Shimadzu Corporation), the cumulative volume calculated from a small diameter end of the distribution reached 50%.

<Core-Shell Ratio of Particulate Polymer>

The core-shell ratio of a particulate polymer was measured by the following procedure.

A produced particulate polymer was sufficiently dispersed in a visible light-curable resin (D-800 produced by JEOL Ltd.) and was subsequently embedded to obtain a block containing the particulate polymer. Next, a measurement sample was prepared by cutting a flake of 100 nm in thickness from the resultant block using a microtome equipped with a diamond blade. The measurement sample was subsequently dyed using ruthenium tetroxide.

Next, the dyed measurement sample was set in a transmission electron microscope (JEM-3100F produced by JEOL Ltd.) and an image of a cross-sectional structure of the particulate polymer was taken with an accelerating voltage of 80 kV. The magnification of the electron microscope was set such that the cross-section of one particle of the particulate polymer fitted within the visible field. Thereafter, the imaged cross-sectional structure of the particulate polymer was observed and, depending on the configuration of an observed shell portion of the particulate polymer, the average thickness of the shell portion was measured by one of the following procedures. The core-shell ratio was determined by dividing the measured average thickness of the shell portion by the volume average particle diameter D50 of the particulate polymer.

<<Case in which Shell Portion was Formed by Polymer Particles>>

The maximum diameter of polymer particles forming the shell portion was measured from the cross-sectional structure of the particulate polymer. Moreover, the maximum diameter of polymer particles forming the shell portion was measured for 20 randomly selected particles of the particulate polymer and an average value of these maximum diameters was taken to be the average thickness of the shell portion.

<<Case in which Shell Portion was not in the Form of Particles>>

The maximum thickness of the shell portion was measured from the cross-sectional structure of the particulate polymer. Moreover, the maximum thickness of the shell portion was measured for 20 randomly selected particles of the particulate polymer and an average value of these maximum thicknesses was taken to be the average thickness of the shell portion.

<Coverage Rate of Particulate Polymer>

The coverage rate of a particulate polymer was measured by the following procedure.

An image of a cross-sectional structure of a particulate polymer was taken in the same way as in the measurement method of the core-shell ratio of a particulate polymer. The length D1 of a circumference of a core portion and the length D2 of a section where a shell portion was in contact with the outer surface of the core portion were measured in the imaged cross-sectional structure of the particulate polymer. The percentage of the outer surface of the core portion that was covered by the shell portion in the particulate polymer (percentage coverage) Rc (%)=(D2/D1)×100 was calculated.

The percentage coverage Rc was measured for 20 randomly selected particles of the particulate polymer and an average value thereof was taken to be the average percentage of the outer surface of the core portion that was covered by the shell portion in the particulate polymer (i.e., the coverage rate).

<Adhesiveness Between Electrode Substrate and Separator Substrate Before Immersion in Electrolysis Solution>

A produced laminate including a positive electrode substrate and a separator substrate and a produced laminate including a negative electrode substrate and a separator substrate were each cut out to 10 mm in width and pressed with conditions of 0.5 MPa and 70° C. to obtain a specimen. Thereafter, each of the specimens was positioned with a surface at the current collector side of the electrode substrate (positive electrode substrate or negative electrode substrate) underneath and cellophane tape was attached to the surface of the electrode substrate. Tape prescribed by JIS Z1522 was used as the cellophane tape. The cellophane tape was fixed to a horizontal test bed. One end of the separator substrate was pulled vertically upward at a pulling speed of 50 mm/minute to peel off the separator substrate and the stress during this pulling was measured. The measurement described above was carried out three times for laminates that each included a positive electrode substrate and a separator substrate and three times for laminates that each included a negative electrode substrate and a separator substrate to give a total of six measurements, and an average value for the stress was determined as the peel strength. The adhesiveness between an electrode substrate and a separator substrate before immersion in an electrolysis solution was evaluated by the following standard.

A: Peel strength of at least 1.0 N/m
B: Peel strength of at least 0.5 N/m and less than 1.0 N/m
C: Peel strength of at least 0.3 N/m and less than 0.5 N/m
D: Peel strength of less than 0.3 N/m <Adhesiveness Between Electrode Substrate and Separator Substrate after Immersion in Electrolysis Solution>

A produced laminate including a positive electrode substrate and a separator substrate and a produced laminate including a negative electrode substrate and a separator substrate were each cut out to 10 mm in width to obtain a specimen. The specimen was immersed in an electrolysis solution for 3 days at a temperature of 60° C. The electrolysis solution was obtained by dissolving $LiPF_6$ as a supporting electrolyte in a mixed solvent of ethylene carbonate, diethyl carbonate, and vinylene carbonate (ethylene carbonate/diethyl carbonate/vinylene carbonate (volume mixing ratio)=68.5/30/1.5; SP value 12.7 $(cal/cm^3)^{1/2}$) such that the $LiPF_6$ had a concentration of 1 mol/L relative to the solvent.

Thereafter, the specimen was removed from the electrolysis solution and electrolysis solution attached to the surface of the specimen was wiped off. Thereafter, the specimen was positioned with a surface at the current collector side of the electrode substrate (positive electrode substrate or negative electrode substrate) underneath and cellophane tape was attached to the surface of the electrode substrate. Tape prescribed by JIS Z1522 was used as the cellophane tape. The cellophane tape was fixed to a horizontal test bed. One end of the separator substrate was pulled vertically upward at a pulling speed of 50 mm/minute to peel off the separator substrate and the stress during this peeling was measured. The measurement described above was carried out three times for laminates that each included a positive electrode substrate and a separator substrate and three times for laminates that each included a negative electrode substrate and a separator substrate to give a total of six measurements, and an average value for the stress was determined as the peel strength. The adhesiveness between an electrode substrate and a separator substrate after immersion in an electrolysis solution was evaluated by the following standard.

A: Peel strength of at least 5.0 N/m
B: Peel strength of at least 3.0 N/m and less than 5.0 N/m
C: Peel strength of at least 0.5 N/m and less than 3.0 N/m
D: Peel strength of less than 0.5 N/m <Blocking Resistance>

Specimens were obtained by cutting a square having a side length of 5 cm and a square having a side length of 4 cm from a functional layer-equipped substrate (separator or electrode) that was produced and the two specimens were overlapped with one another. Two pairs of specimens were prepared as described above. One of the pairs was used as prepared as a "non-pressed state sample" and the other pair was placed under pressure of 10 g/cm$^2$ at 40° C. after the specimens had been overlapped with one another and was then used as a "pressed sample". After each of the samples had been left for 24 hours, the state of adhesion between the overlapped separators or electrodes (blocking state) was visually confirmed and blocking resistance was evaluated by the following standard.

A: Blocking of functional layer-equipped substrates does not occur in "non-pressed state sample" and "pressed sample"

B: Blocking of functional layer-equipped substrates does not occur in "non-pressed state sample" but does occur in "pressed sample" (however, the functional layer-equipped substrates can be peeled apart by hand)

C: Blocking of functional layer-equipped substrates does not occur in "non-pressed state sample" but does occur in "pressed sample" (the functional layer-equipped substrates cannot be peeled apart by hand)

D: Blocking of functional layer-equipped substrates occurs in "pressed sample" and "non-pressed state sample"

<High-Temperature Cycle Characteristics>

A produced wound cell lithium ion secondary battery having a discharge capacity of 800 mAh was left for 24 hours at an ambient temperature of 25° C. Thereafter, a charge/discharge operation in which charging was performed to 4.35 V at 0.1 C and discharging was performed to 2.75 V at 0.1 C was carried out at an ambient temperature of 25° C. The initial capacity C0 in this operation was measured. Charging and discharging were then performed repeatedly at an ambient temperature of 60° C. with the same conditions and the capacity C1 after 1,000 cycles was measured. The rate of capacity maintenance before and after cycling $\Delta C$ (%)=(C1/C0)×100 was calculated and high-temperature cycle characteristics were evaluated by the following standard. A higher capacity maintenance rate $\Delta C$ indicates better high-temperature cycle characteristics and longer battery life.

A: Capacity maintenance rate $\Delta C$ of at least 84%

B: Capacity maintenance rate $\Delta C$ of at least 80% and less than 84%

C: Capacity maintenance rate $\Delta C$ of at least 75% and less than 80%

D: Capacity maintenance rate $\Delta C$ of less than 75%

<Low-Temperature Output Characteristics>

A produced wound cell lithium ion secondary battery having a discharge capacity of 800 mAh was left for 24 hours at an ambient temperature of 25° C. Thereafter, a charging operation was performed for 5 hours at a charging rate of 0.1 C and an ambient temperature of 25° C., and the voltage V0 in this operation was measured. Thereafter, a discharge operation was performed at a discharging rate of 1 C and an ambient temperature of −10° C., and the voltage V1 15 seconds after the start of discharging was measured. A voltage change $\Delta V = V0-V1$ was calculated and low-temperature output characteristics were evaluated by the following standard. A smaller voltage change $\Delta V$ indicates better low-temperature output characteristics.

A: Voltage change $\Delta V$ of less than 350 mV

B: Voltage change $\Delta V$ of at least 350 mV and less than 500 mV

C: Voltage change $\Delta V$ of at least 500 mV and less than 650 mV

D: Voltage change $\Delta V$ of at least 650 mV

<Low-Temperature Shutdown Characteristics of Functional Layer>

First, the air resistance of a produced separator (air resistance before immersion in electrolysis solution) was measured in accordance with JIS P8117. Thereafter, the separator was immersed in an electrolysis solution for 30 minutes at 90° C. The electrolysis solution was obtained by dissolving LiPF$_6$ as a supporting electrolyte in a mixed solvent of ethylene carbonate, diethyl carbonate, and vinylene carbonate (ethylene carbonate/diethyl carbonate/vinylene carbonate (volume mixing ratio)=68.5/30/1.5; SP value 12.7 (cal/cm$^3$)$^{1/2}$) such that the LiPF$_6$ had a concentration of 1 mol/L relative to the solvent.

The separator was removed from the electrolysis solution and, after electrolysis solution attached to the surface thereof had been wiped off, was vacuum dried for 10 hours at 30° C. Thereafter, the air resistance of the separator (air resistance after immersion in electrolysis solution) was measured in accordance with JIS P8117. The rate of air resistance increase $\Delta A$ (%)=(air resistance after immersion in electrolysis solution)÷(air resistance before immersion in electrolysis solution)×100 was calculated and was evaluated by the following standard. A higher rate of air resistance increase $\Delta A$ indicates that a functional layer has better low-temperature shutdown characteristics.

A: Rate of air resistance increase $\Delta A$ of at least 500%

B: Rate of air resistance increase $\Delta A$ of at least 200% and less than 500%

C: Rate of air resistance increase $\Delta A$ of at least 100% and less than 200%

D: Rate of air resistance increase $\Delta A$ of less than 100%

Example 1

<Production of Particulate Polymer>

A 5 MPa pressure vessel equipped with a stirrer was charged with 35 parts of methyl methacrylate and 30 parts of butyl acrylate as (meth)acrylic acid ester monomers, 4 parts of methacrylic acid as an acid group-containing monomer, and 1 part of ethylene dimethacrylate as a crosslinkable monomer for formation of a core portion, and was also charged with 1 part of sodium dodecylbenzenesulfonate as an emulsifier, 150 parts of deionized water, and 0.5 parts of potassium persulfate as a polymerization initiator. The contents of the pressure vessel were sufficiently stirred and were then heated to 60° C. to initiate polymerization. Polymerization was continued until a polymerization conversion rate of 96% was reached to yield an aqueous dispersion containing a polymer in particle-form that formed a core portion.

Next, 28 parts of styrene as an aromatic vinyl monomer and 2 parts of methacrylic acid as an acid group-containing monomer for formation of a shell portion were continuously added to the aqueous dispersion and polymerization was continued while heating the contents of the pressure vessel to 70° C. The reaction was terminated by cooling at the point at which the polymerization conversion rate reached 96%. As a result, an aqueous dispersion was produced that contained a particulate polymer having a core-shell structure in which the outer surface of a core portion was partially covered by a shell portion.

The volume average particle diameter D50 of the resultant particulate polymer was 0.45 μm.

The core-shell ratio and coverage rate of the resultant particulate polymer were evaluated. The results are shown in Table 1.

<Production of Binder for Functional Layer>

A reaction vessel equipped with a stirrer was charged with 70 parts of deionized water, 0.15 parts of sodium lauryl sulfate (produced by Kao Chemicals, product name: EMAL 2F) as an emulsifier, and 0.5 parts of ammonium persulfate. The gas phase in the reaction vessel was purged with nitrogen gas and the contents of the reaction vessel were heated to 60° C.

A monomer mixture was prepared in a separate container by mixing 50 parts of deionized water, 0.5 parts of sodium dodecylbenzenesulfonate as a dispersant, 95 parts of butyl acrylate as a (meth)acrylic acid ester monomer, 2 parts of acrylonitrile, 2 parts of methacrylic acid, and 1 part of N-methylolacrylamide. The monomer mixture was continuously added to the reaction vessel over 4 hours while carrying out polymerization. A reaction was carried out at 60° C. during the addition. After the addition was completed, stirring was carried out for a further 3 hours at 70° C. to complete the reaction and yield an aqueous dispersion containing a binder for a functional layer.

The resultant binder for a functional layer had a volume average particle diameter D50 of 0.36 μm and a glass transition temperature of −40° C.

<Production of Composition for Non-Aqueous Secondary Battery Functional Layer>

A composition for a non-aqueous secondary battery functional layer was produced in the form of a slurry by mixing 14 parts by solid content equivalents of the aqueous dispersion containing the binder for a functional layer, 2 parts by solid content equivalents of an ethylene oxide-propylene oxide copolymer (solid content concentration: 70 mass %, polymerization ratio: 5/5 (mass ratio)) as a wetting agent, and 0.0005 parts by solid content equivalents of 1,2-benzoisothiazolin-3-one (solid content concentration: 5.0 mass %) relative to 100 parts by solid content equivalents of the aqueous dispersion containing the particulate polymer having the core-shell structure, and further mixing deionized water to adjust the solid content concentration to 15 mass %.

<Production of Separator>

A polyethylene porous substrate (thickness: 16 μm. Gurley value: 210 s/100 cc) was prepared as a separator substrate. The composition for a functional layer was applied onto both surfaces of the prepared separator substrate by spray coating and was dried for 1 minute at 50° C. As a result, functional layers of 1 μm in thickness per layer were formed on the separator substrate and a separator (functional layer-equipped substrate) was produced that included the separator substrate and the functional layers formed on both surfaces thereof.

The blocking resistance and low-temperature shutdown characteristics of the obtained separator were evaluated. The results are shown in Table 1.

<Production of Negative Electrode Substrate>

A 5 MPa pressure vessel equipped with a stirrer was charged with 33.5 parts of 1,3-butadiene, 3.5 parts of itaconic acid, 62 parts of styrene, 1 part of 2-hydroxyethyl acrylate, 0.4 parts of sodium dodecylbenzenesulfonate as an emulsifier, 150 parts of deionized water, and 0.5 parts of potassium persulfate as a polymerization initiator. The contents of the pressure vessel were sufficiently stirred and were then heated to 50° C. to initiate polymerization. The reaction was terminated by cooling at the point at which the polymerization conversion rate reached 96% to yield a mixture containing a particulate binder (SBR). The mixture containing the particulate binder was adjusted to pH 8 through addition of 5% sodium hydroxide aqueous solution and unreacted monomers were removed from the mixture by heated vacuum distillation. Thereafter, cooling was performed to 30° C. or lower to yield an aqueous dispersion containing the target particulate binder.

Next, 100 parts of artificial graphite (volume average particle diameter D50: 15.6 μm) as a negative electrode active material, 1 part by solid content equivalents of a 2% aqueous solution of a carboxymethyl cellulose sodium salt (MAC350HC produced by Nippon Paper Industries Co., Ltd.) as a thickener, and deionized water were added to adjust the solid content concentration to 68% and then mixing was carried out for 60 minutes at 25° C. to yield a mixed liquid. The mixed liquid was adjusted to a solid content concentration of 62% through addition of deionized water and was then mixed for a further 15 minutes at 25° C. Next, 1.5 parts by solid content equivalents of the aqueous dispersion containing the particulate binder was added to this mixed liquid, further deionized water was added to adjust the final solid content concentration to 52%, and a further 10 minutes of mixing was carried out. The resultant mixed liquid was subjected to a defoaming process under reduced pressure to yield a slurry composition for a secondary battery negative electrode having good fluidity.

A comma coater was used to apply the slurry composition for a secondary battery negative electrode onto copper foil of 20 μm in thickness, used as a current collector, such as to have a thickness of approximately 150 μm after drying. The slurry composition for a secondary battery negative electrode was then dried by conveying the copper foil inside of a 60° C. oven for 2 minutes at a speed of 0.5 m/minute. Thereafter, heat treatment was carried out for 2 minutes at 120° C. to obtain a pre-pressing negative electrode web. The pre-pressing negative electrode web was rolled by roll pressing to obtain a post-pressing negative electrode substrate including a negative electrode mixed material layer of 80 μm in thickness.

<Production of Positive Electrode Substrate>

A mixture of 100 parts of $LiCoO_2$ (volume average particle diameter D50: 12 μm) as a positive electrode active material, 2 parts of acetylene black (produced by Denki Kagaku Kogyo Kabushiki Kaisha, product name: HS-100) as a conductive material, and 2 parts by solid content equivalents of polyvinylidene fluoride (produced by Kureha Corporation, product name: #7208) as a binder was prepared, and the total solid content concentration thereof was adjusted to 70% through addition of N-methylpyrrolidone. A planetary mixer was then used to perform mixing to yield a slurry composition for a secondary battery positive electrode.

A comma coater was used to apply the slurry composition for a secondary battery positive electrode onto aluminum foil of 20 μm in thickness, used as a current collector, such as to have a thickness of approximately 150 μm after drying. The applied slurry composition for a secondary battery positive electrode was dried by conveying the aluminum foil inside of a 60° C. oven for 2 minutes at a speed of 0.5 m/minute. Thereafter, heat treatment was carried out for 2 minutes at 120° C. to obtain a pre-pressing positive electrode web. The pre-pressing positive electrode web was rolled by roll pressing to obtain a post-pressing positive electrode substrate including a positive electrode mixed material layer of 80 μm in thickness.

<Production of Laminate Including Electrode Substrate and Separator Substrate>

A positive electrode substrate, negative electrode substrate, and separator obtained as described above were cut out as circular shapes having diameters of 13 mm, 14 mm, and 18 mm, respectively, to obtain a circular positive electrode substrate, a circular negative electrode substrate, and a circular separator. A laminate including a positive electrode substrate and a separator substrate was obtained by placing a surface at the positive electrode mixed material layer side of the circular positive electrode substrate along one surface of the circular separator and performing heat pressing for 10 seconds at a temperature of 80° C. and a pressure of 0.5 MPa to pressure bond the positive electrode substrate to the separator. Additionally, a laminate including a negative electrode substrate and a separator substrate was obtained by placing a surface at the negative electrode mixed material layer side of the circular negative electrode substrate along one surface of another circular separator and performing heat pressing for 10 seconds at a temperature of 70° C. and a pressure of 0.5 MPa to pressure bond the negative electrode substrate to the separator.

Each of the obtained laminates including an electrode substrate (positive electrode substrate or negative electrode substrate) and a separator substrate was used to evaluate adhesiveness between the electrode substrate and the separator substrate before and after immersion in an electrolysis solution. The results are shown in Table 1.

<Production of Non-Aqueous Secondary Battery>

A positive electrode substrate obtained as described above was cut out to 49 cm×5 cm in size. Next, a separator obtained as described above was cut out to 55 cm×5.5 cm in size and was arranged on the positive electrode mixed material layer of the cut out positive electrode substrate. Moreover, a negative electrode obtained as described above was cut out to 50 cm×5.2 cm in size and was arranged on a surface of the separator at the opposite thereof relative to the positive electrode substrate such that a surface at the negative electrode mixed material layer side of the negative electrode substrate faced toward the separator. Thereafter, heat pressing was performed for 2 minutes at 10 MPa and 70° C. The pressed product was then wound by a winding machine to obtain a wound product. The wound product was further pressed at 70° C. and 0.5 MPa to obtain a flat product. The flat product was packed in an aluminum packing case used as a battery case. The aluminum packing case was filled with an electrolysis solution (solvent: ethylene carbonate/diethyl carbonate/vinylene carbonate (volume mixing ratio)=68.5/30/1.5, supporting electrolyte: $LiPF_6$ of 1M in concentration) such that no air remained. The aluminum case was then closed by heat sealing at 150° C. to tightly seal an opening of the aluminum packing. In this manner, a pre-pressing, wound lithium ion secondary battery having a discharge capacity of 800 mAh was produced. The pre-pressing, wound lithium ion secondary battery was pressed at 90° C. and 0.5 MPa to produce a non-aqueous secondary battery in the form of a wound lithium ion secondary battery. The high-temperature cycle characteristics and low-temperature output characteristics of the produced lithium ion secondary battery were evaluated. The results are shown in Table 1.

Examples 2-5

In each example, a particulate polymer having a core-shell structure, a binder for a functional layer, a composition for a non-aqueous secondary battery functional layer, a separator, a negative electrode substrate, a positive electrode substrate, a laminate including an electrode substrate and a separator substrate, and a non-aqueous secondary battery were produced in the same way as in Example 1 with the exception that in production of the polymer forming the core portion, the amounts of methyl methacrylate and butyl acrylate used as (meth)acrylic acid ester monomers were changed as shown in Table 1. Each evaluation was performed in the same way as in Example 1. The results are shown in Table 1.

Examples 6 and 7

In each example, a particulate polymer having a core-shell structure, a binder for a functional layer, a composition for a non-aqueous secondary battery functional layer, a separator, a negative electrode substrate, a positive electrode substrate, a laminate including an electrode substrate and a separator substrate, and a non-aqueous secondary battery were produced in the same way as in Example 1 with the exception that in production of the polymer forming the core portion, the amounts of butyl acrylate used as a (meth)acrylic acid ester monomer and ethylene dimethacrylate used as a crosslinkable monomer were changed as shown in Table 1. Each evaluation was performed in the same way as in Example 1. The results are shown in Table 1.

Example 8

A particulate polymer having a core-shell structure, a binder for a functional layer, a composition for a non-aqueous secondary battery functional layer, a separator, a negative electrode substrate, a positive electrode substrate, a laminate including an electrode substrate and a separator substrate, and a non-aqueous secondary battery were produced in the same way as in Example 1 with the exception that in production of the polymer forming the core portion, the amounts of methyl methacrylate and butyl acrylate used as (meth)acrylic acid ester monomers, methacrylic acid used as a (meth)acrylic acid monomer, and ethylene dimethacrylate used as a crosslinkable monomer were changed as shown in Table 1, and 2-ethylhexyl acrylate was used as a (meth)acrylic acid ester monomer in the amount shown in Table 1. Each evaluation was performed in the same way as in Example 1. The results are shown in Table 1.

Examples 9 and 10

In each example, a particulate polymer having a core-shell structure, a binder for a functional layer, a composition for a non-aqueous secondary battery functional layer, a separator, a negative electrode substrate, a positive electrode substrate, a laminate including an electrode substrate and a separator substrate, and a non-aqueous secondary battery were produced in the same way as in Example 1 with the exception that in production of the aqueous dispersion containing the particulate polymer having the core-shell structure, the amounts of styrene continuously added as an aromatic vinyl monomer and methacrylic acid continuously added as an acid group-containing monomer were changed as shown in Table 1, and 2-ethylhexyl acrylate as a (meth)acrylic acid ester monomer and ethylene dimethacrylate as a crosslinkable monomer were also continuously added in the amounts shown in Table 1. Each evaluation was performed in the same way as in Example 1. The results are shown in Table 1.

Examples 11 and 12

In each example, a particulate polymer having a core-shell structure, a binder for a functional layer, a composition for a non-aqueous secondary battery functional layer, a separator, a negative electrode substrate, a positive electrode substrate, a laminate including an electrode substrate and a separator substrate, and a non-aqueous secondary battery were produced in the same way as in Example 1 with the exception that in production of the aqueous solution containing the particulate polymer having the core-shell structure, the amount of styrene continuously added as an aromatic vinyl monomer was changed as shown in Table 1, and methacrylic acid used as an acid group-containing monomer was replaced with methyl methacrylate and the amount thereof was changed as shown in Table 1. Each evaluation was performed in the same way as in Example 1. The results are shown in Table 1.

Example 13

A particulate polymer having a core-shell structure, a binder for a functional layer, a composition for a non-aqueous secondary battery functional layer, a laminate including an electrode substrate and a separator substrate, and a non-aqueous secondary battery were produced in the same way as in Example 1 with the exception that in production of the aqueous dispersion containing the particulate polymer having the core-shell structure, the amounts of styrene continuously added as an aromatic vinyl monomer and methacrylic acid continuously added as an acid group-containing monomer were changed as shown in Table 1, a separator substrate was used without a functional layer being formed, and a negative electrode, a positive electrode, a laminate including an electrode substrate and a separator substrate, and a non-aqueous secondary battery were produced as described below. Each evaluation was performed in the same way as in Example 1. The results are shown in Table 1.

<Production of Negative Electrode>

A negative electrode substrate was obtained in the same way as in Example 1. The composition for a functional layer was applied onto a surface at the negative electrode mixed material layer side of the negative electrode substrate by spray coating and was dried for 1 minute at 50° C. As a result, a negative electrode (functional layer-equipped negative electrode substrate) was obtained in which a functional layer of 1 μm in thickness was formed on the surface at the negative electrode mixed material layer side of the negative electrode substrate.

The blocking resistance of the obtained negative electrode was evaluated. The results are shown in Table 1.

<Production of Positive Electrode>

A positive electrode substrate was obtained in the same way as in Example 1. The composition for a functional layer was applied onto a surface at the positive electrode mixed material layer side of the positive electrode substrate by spray coating and was dried for 1 minute at 50° C. As a result, a positive electrode (functional layer-equipped positive electrode substrate) was obtained in which a functional layer of 1 μm in thickness was formed on the surface at the positive electrode mixed material layer side of the positive electrode substrate.

<Production of Laminate Including Electrode Substrate and Separator Substrate>

A positive electrode, negative electrode, and separator substrate obtained as described above were cut out as circular shapes having diameters of 13 mm, 14 mm, and 18 mm, respectively, to obtain a circular positive electrode, a circular negative electrode, and a circular separator substrate. A laminate including a positive electrode substrate and a separator substrate was obtained by placing a surface at the functional layer side of the circular positive electrode along one surface of the circular separator substrate and performing heat pressing for 10 seconds at a temperature of 80° C. and a pressure of 0.5 MPa to pressure bond the positive electrode to the separator substrate. A laminate including a negative electrode substrate and a separator substrate was obtained by placing a surface at the functional layer side of the circular negative electrode along one surface of another circular separator substrate and performing heat pressing for 10 seconds at a temperature of 80° C. and a pressure of 0.5 MPa to pressure bond the negative electrode to the separator substrate.

Each of the obtained laminates including an electrode substrate (positive electrode substrate or negative electrode substrate) and a separator substrate was used to evaluate adhesiveness between the electrode substrate and the separator substrate before and after immersion in an electrolysis solution. The results are shown in Table 1.

<Production of Non-Aqueous Secondary Battery>

A positive electrode obtained as described above was cut out to 49 cm×5 cm in size. Next, a separator substrate was cut out to 55 cm×5.5 cm in size and was arranged on the functional layer of the cut out positive electrode. Moreover, a negative electrode obtained as described above was cut out to 50 cm×5.2 cm in size and was arranged on a surface of the separator substrate at the opposite side thereof relative to the positive electrode such that a surface at the functional layer side of the negative electrode faced toward the separator substrate. Thereafter, heat pressing was performed for 2 minutes at 10 MPa and 70° C. The pressed product was then wound by a winding machine to obtain a wound product. The wound product was further pressed at 70° C. and 0.5 MPa to obtain a flat product. The flat product was packed in an aluminum packing case used as a battery case. The aluminum packing case was filled with an electrolysis solution (solvent: ethylene carbonate/diethyl carbonate/vinylene carbonate (volume mixing ratio)=68.5/30/1.5, supporting electrolyte: $LiPF_6$ of 1M in concentration) such that no air remained. The aluminum case was then closed by heat sealing at 150° C. to tightly seal an opening of the aluminum packing. In this manner, a pre-pressing, wound lithium ion secondary battery having a discharge capacity of 800 mAh was produced. The pre-pressing, wound lithium ion secondary battery was pressed at 90° C. and 0.5 MPa to produce a non-aqueous secondary battery in the form of a wound lithium ion secondary battery. The high-temperature cycle characteristics and low-temperature output characteristics of the produced lithium ion secondary battery were evaluated. The results are shown in Table 1.

Comparative Example 1

A particulate polymer having a core-shell structure, a binder for a functional layer, a composition for a non-aqueous secondary battery functional layer, a separator, a negative electrode substrate, a positive electrode substrate, a laminate including an electrode substrate and a separator substrate, and a non-aqueous secondary battery were produced in the same way as in Example 1 with the exception that in production of the polymer forming the core portion, the amounts of methyl methacrylate and butyl acrylate used as (meth)acrylic acid ester monomers and ethylene dimethacrylate used as a crosslinkable monomer were changed as shown in Table 1, and in production of the aqueous dispersion containing the particulate polymer having the core-shell structure, the amounts of styrene continuously added as an aromatic vinyl monomer and methacrylic acid continuously added as an acid group-containing monomer were changed as shown in Table 1. Each evaluation was performed in the same way as in Example 1. The results are shown in Table 1.

Comparative Example 2

A particulate polymer having a core-shell structure, a binder for a functional layer, a composition for a non-aqueous secondary battery functional layer, a separator, a negative electrode substrate, a positive electrode substrate, a laminate including an electrode substrate and a separator substrate, and a non-aqueous secondary battery were produced in the same way as in Comparative Example 1 with the exception that in production of the polymer forming the core portion, the amounts of methyl methacrylate and butyl acrylate used as (meth)acrylic acid ester monomers, methacrylic acid used as a (meth)acrylic acid monomer, and ethylene dimethacrylate used as a crosslinkable monomer were changed as shown in Table 1, and 2-ethylhexyl acrylate was additionally used as a (meth)acrylic acid ester monomer in the amount shown in Table 1. Each evaluation was performed in the same way as in Comparative Example 1. The results are shown in Table 1.

Comparative Example 3

A particulate polymer having a core-shell structure, a binder for a functional layer, a composition for a non-aqueous secondary battery functional layer, a separator, a negative electrode substrate, a positive electrode substrate, a laminate including an electrode substrate and a separator substrate, and a non-aqueous secondary battery were produced in the same way as in Comparative Example 1 with the exception that in production of the polymer forming the core portion, the amounts of methyl methacrylate and butyl acrylate used as (meth)acrylic acid ester monomers, and ethylene dimethacrylate used as a crosslinkable monomer were changed as shown in Table 1, and 2-ethylhexyl acrylate was additionally used as a (meth)acrylic acid ester monomer in the amount shown in Table 1. Each evaluation was performed in the same way as in Comparative Example 1. The results are shown in Table 1.

Comparative Example 4

A particulate polymer having a core-shell structure, a binder for a functional layer, a composition for a non-aqueous secondary battery functional layer, a separator, a negative electrode substrate, a positive electrode substrate, a laminate including an electrode substrate and a separator substrate, and a non-aqueous secondary battery were produced in the same way as in Example 1 with the exception that in production of the aqueous dispersion containing the particulate polymer having the core-shell structure, the amounts of styrene continuously added as an aromatic vinyl monomer and methacrylic acid continuously added as an acid group-containing monomer were changed as shown in Table 1, and ethylene dimethacrylate was also continuously added as a crosslinkable monomer in an amount shown in Table 1. Each evaluation was performed in the same way as in Example 1. The results are shown in Table 1.

Comparative Example 5

A particulate polymer having a core-shell structure, a binder for a functional layer, a composition for a non-aqueous secondary battery functional layer, a separator, a negative electrode substrate, a positive electrode substrate, a laminate including an electrode substrate and a separator substrate, and a non-aqueous secondary battery were produced in the same way as in Example 1 with the exception that in production of the aqueous dispersion containing the particulate polymer having the core-shell structure, the amounts of styrene continuously added as an aromatic vinyl monomer and methacrylic acid continuously added as an acid group-containing monomer were changed as shown in Table 1, and 2-ethylhexyl acrylate was also continuously added as a (meth)acrylic acid ester monomer in an amount shown in Table 1. Each evaluation was performed in the same way as in Example 1. The results are shown in Table 1.

TABLE 1

| | | | | Example 1 | Example 2 | Example 3 | Example 4 | Example 5 | Example 6 | Example 7 | Example 8 | Example 9 |
|---|---|---|---|---|---|---|---|---|---|---|---|---|
| Particulate polymer | Core portion | Composition | Methyl methacrylate [parts by mass] | 35 | 38 | 42 | 20 | 5 | 35 | 35 | 35.6 | 35 |
| | | | Butyl acrylate [parts by mass] | 30 | 27 | 23 | 45 | 60 | 30.7 | 29 | 15 | 30 |
| | | | 2-Ethylhexyl acrylate [parts by mass] | — | — | — | — | — | — | — | 15 | — |
| | | | Methacrylic acid [parts by mass] | 4 | 4 | 4 | 4 | 4 | 4 | 4 | 3 | 4 |
| | | | Ethylene dimethacrylate [parts by mass] | 1 | 1 | 1 | 1 | 1 | 0.3 | 2 | 1.4 | 1 |
| | | Glass transition temperature [° C.] | | 39 | 48 | 58 | 8 | −45 | 40 | 39 | 37 | 39 |
| | | Degree of swelling in electrolysis solution [factor] | | 21 | 22 | 23 | 20 | 18 | 27 | 17 | 6 | 21 |
| | Shell portion | Composition | Styrene [parts by mass] | 28 | 28 | 28 | 28 | 28 | 28 | 28 | 28 | 20 |
| | | | Methacrylic acid [parts by mass] | 2 | 2 | 2 | 2 | 2 | 2 | 2 | 2 | — |
| | | | Methyl methacrylate [parts by mass] | — | — | — | — | — | — | — | — | — |
| | | | Ethylene dimethacrylate [parts by mass] | — | — | — | — | — | — | — | — | 1 |

TABLE 1-continued

|  |  |  |  |  |  |  |  |  |  |  |  |
|---|---|---|---|---|---|---|---|---|---|---|---|
|  |  |  | 2-Ethylhexyl acrylate [parts by mass] | — | — | — | — | — | — | — | — | 9 |
|  |  |  | Glass transition temperature [° C.] | 103 | 103 | 103 | 103 | 103 | 103 | 103 | 103 | 83 |
|  |  |  | Degree of swelling in electrolysis solution [factor] | 1.3 | 1.3 | 1.3 | 1.3 | 1.3 | 1.3 | 1.3 | 1.3 | 1.2 |
|  |  |  | Core-shell ratio [%] | 16 | 16 | 16 | 16 | 16 | 16 | 16 | 16 | 16 |
|  |  |  | Coverage rate [%] | 75 | 75 | 75 | 75 | 75 | 75 | 75 | 75 | 80 |
|  |  |  | Volume average particle diameter D50 [μm] | 0.45 | 0.45 | 0.45 | 0.45 | 0.45 | 0.45 | 0.45 | 0.45 | 0.45 |
| Binder for functional layer | Composition |  | Butyl acrylate [parts by mass] | 95 | 95 | 95 | 95 | 95 | 95 | 95 | 95 | 95 |
|  |  |  | Acrylonitrile [parts by mass] | 2 | 2 | 2 | 2 | 2 | 2 | 2 | 2 | 2 |
|  |  |  | Methacrylic acid [parts by mass] | 2 | 2 | 2 | 2 | 2 | 2 | 2 | 2 | 2 |
|  |  |  | N-Methylolacrylamide [parts by mass] | 1 | 1 | 1 | 1 | 1 | 1 | 1 | 1 | 1 |
|  |  |  | Volume average particle diameter D50 [μm] | 0.36 | 0.36 | 0.36 | 0.36 | 0.36 | 0.36 | 0.36 | 0.36 | 0.36 |
|  |  |  | Glass transition temperature [° C.] | -40 | -40 | -40 | -40 | -40 | -40 | -40 | -40 | -40 |
|  |  |  | Amount [parts by mass/100 parts by mass of particulate polymer] | 14 | 14 | 14 | 14 | 14 | 14 | 14 | 14 | 14 |
| Substrate | Substrate on which functional layer is formed |  |  | Separator substrate | Separator substrate | Separator substrate | Separator substrate | Separator substrate | Separator substrate | Separator substrate | Separator substrate | Separator substrate |
| Evaluation | Adhesiveness between electrode substrate and separator substrate before immersion in electrolysis solution |  |  | A | A | B | A | A | A | A | A | A |
|  | Adhesiveness between electrode substrate and separator substrate after immersion in electrolysis solution |  |  | A | A | A | A | A | B | A | A | A |
|  | Blocking resistance |  |  | A | A | A | A | C | A | A | A | A |
|  | High-temperature cycle characteristics |  |  | A | A | A | A | A | B | A | B | A |
|  | Low-temperature output characteristics |  |  | A | A | A | A | A | A | A | B | A |
|  | Low-temperature shutdown characteristics |  |  | A | A | A | A | A | A | A | A | A |

|  |  |  |  | Example 10 | Example 11 | Example 12 | Example 13 | Comparative Example 1 | Comparative Example 2 | Comparative Example 3 | Comparative Example 4 | Comparative Example 5 |
|---|---|---|---|---|---|---|---|---|---|---|---|---|
| Particulate polymer | Core portion | Composition | Methyl methacrylate [parts by mass] | 35 | 35 | 35 | 35 | 60.8 | — | 35 | 35 | 35 |
|  |  |  | Butyl acrylate [parts by mass] | 30 | 30 | 30 | 30 | 5 | — | — | 30 | 30 |
|  |  |  | 2-Ethylhexyl acrylate [parts by mass] | — | — | — | — | — | 68.5 | 30 | — | — |
|  |  |  | Methacrylic acid [parts by mass] | 4 | 4 | 4 | 4 | 4 | 1 | 4 | 4 | 4 |
|  |  |  | Ethylene dimethacrylate [parts by mass] | 1 | 1 | 1 | 1 | 0.2 | 0.5 | 1 | 1 | 1 |
|  |  |  | Glass transition temperature [° C.] | 39 | 39 | 39 | 39 | 80 | -60 | 35 | 39 | 39 |
|  |  |  | Degree of swelling in electrolysis solution [factor] | 21 | 21 | 21 | 21 | 35 | 2 | 3 | 21 | 21 |
|  | Shell portion | Composition | Styrene [parts by mass] | 14 | 25.5 | 20 | 30 | 30 | 30 | 30 | 29.7 | 10 |
|  |  |  | Methacrylic acid [parts by mass] | — | — | — | — | — | — | — | — | — |
|  |  |  | Methyl methacrylate [parts by mass] | — | 4.5 | 10 | — | — | — | — | — | — |
|  |  |  | Ethylene dimethacrylate [parts by mass] | 1 | — | — | — | — | — | — | 0.3 | — |
|  |  |  | 2-Ethylhexyl acrylate [parts by mass] | 15 | — | — | — | — | — | — | — | 20 |
|  |  |  | Glass transition temperature [° C.] | 55 | 102 | 102 | 103 | 103 | 103 | 103 | 102 | 40 |
|  |  |  | Degree of swelling in electrolysis solution [factor] | 1.3 | 2.8 | 4.0 | 1.3 | 1.3 | 1.3 | 1.3 | 5 | 1.3 |
|  |  |  | Core-shell ratio [%] | 16 | 16 | 16 | 16 | 16 | 16 | 16 | 16 | 16 |
|  |  |  | Coverage rate [%] | 84 | 75 | 75 | 75 | 75 | 75 | 75 | 75 | 75 |
|  |  |  | Volume average particle diameter D50 [μm] | 0.45 | 0.45 | 0.45 | 0.45 | 0.45 | 0.45 | 0.45 | 0.45 | 0.45 |
| Binder for functional layer | Composition |  | Butyl acrylate [parts by mass] | 95 | 95 | 95 | 95 | 95 | 95 | 95 | 95 | 95 |
|  |  |  | Acrylonitrile [parts by mass] | 2 | 2 | 2 | 2 | 2 | 2 | 2 | 2 | 2 |
|  |  |  | Methacrylic acid [parts by mass] | 2 | 2 | 2 | 2 | 2 | 2 | 2 | 2 | 2 |
|  |  |  | N-Methylolacrylamide [parts by mass] | 1 | 1 | 1 | 1 | 1 | 1 | 1 | 1 | 1 |
|  |  |  | Volume average particle diameter D50 [μm] | 0.36 | 0.36 | 0.36 | 0.36 | 0.36 | 0.36 | 0.36 | 0.36 | 0.36 |
|  |  |  | Glass transition temperature [° C.] | -40 | -40 | -40 | -40 | -40 | -40 | -40 | -40 | -40 |
|  |  |  | Amount [parts by mass/100 parts by mass of particulate polymer] | 14 | 14 | 14 | 14 | 14 | 14 | 14 | 14 | 14 |
| Substrate | Substrate on which functional layer is formed |  |  | Separator substrate | Separator substrate | Separator substrate | Positive/negative electrode substrate | Separator substrate | Separator substrate | Separator substrate | Separator substrate | Separator substrate |

TABLE 1-continued

| Evaluation | | | | | | | | | | |
|---|---|---|---|---|---|---|---|---|---|---|
| | Adhesiveness between electrode substrate and separator substrate before immersion in electrolysis solution | A | A | A | A | D | A | A | A | A |
| | Adhesiveness between electrode substrate and separator substrate after immersion in electrolysis solution | B | A | B | A | C | B | A | D | B |
| | Blocking resistance | B | A | A | A | A | D | B | B | D |
| | High-temperature cycle characteristics | B | A | B | A | C | B | D | D | B |
| | Low-temperature output characteristics | A | A | A | A | C | D | D | C | A |
| | Low-temperature shutdown characteristics | A | A | A | A | C | A | B | D | A |

It can be seen from Table 1 that in the case of Examples 1-13 in which a composition was used that contained a particulate polymer having the specific core-shell structure and specific properties, it was possible to achieve high battery component blocking resistance while also causing a functional layer to display excellent adhesiveness both before and after immersion in an electrolysis solution, and it was also possible to obtain a secondary battery having good battery characteristics such as high-temperature cycle characteristics, low-temperature output characteristics, and low-temperature shutdown characteristics.

Moreover, it can be seen from Table 1 that in the case of Comparative Example 1 in which the core portion of the particulate polymer had a glass transition temperature of higher than 60° C. and a degree of swelling in electrolysis solution of greater than a factor of 30, adhesiveness between an electrode substrate and a separator substrate before immersion in an electrolysis solution was low, and it was not possible to obtain adequate low-temperature shutdown characteristics or a secondary battery having excellent battery characteristics such as high-temperature cycle characteristics and low-temperature output characteristics.

Furthermore, it can be seen from Table 1 that in the case of Comparative Example 2 in which the core portion of the particulate polymer had a glass transition temperature of lower than −50° C. and a degree of swelling in electrolysis solution of smaller than a factor of 5, battery component blocking resistance was poor and it was not possible to obtain a secondary battery having excellent low-temperature output characteristics.

Also, it can be seen from Table 1 that in the case of Comparative Example 3 in which the core portion of the particulate polymer had a degree of swelling in electrolysis solution of smaller than a factor of 5, it was not possible to obtain a secondary battery having excellent battery characteristics such as high-temperature cycle characteristics and low-temperature output characteristics.

Moreover, it can be seen from Table 1 that in the case of Comparative Example 4 in which the shell portion of the particulate polymer had a degree of swelling in electrolysis solution of greater than a factor of 4, adhesiveness between an electrode substrate and a separator substrate after immersion in an electrolysis solution was low and is was not possible to obtain a secondary battery having excellent battery characteristics such as high-temperature cycle characteristics and low-temperature output characteristics. In addition, since the adhesiveness between an electrode substrate and a separator substrate after immersion in an electrolysis solution was low in Comparative Example 4, it was also not possible to obtain adequate low temperature shutdown characteristics.

Furthermore, it can be seen from Table 1 that in the case of Comparative Example 5 in which the shell portion of the particulate polymer had a glass transition temperature of lower than 50° C., battery component blocking resistance was poor.

INDUSTRIAL APPLICABILITY

According to the present disclosure, it is possible to provide a composition for a non-aqueous secondary battery functional layer capable of forming a functional layer for a non-aqueous secondary battery that can provide a battery component with high blocking resistance and cause excellent adhesiveness to be displayed both before and after immersion in an electrolysis solution.

Moreover, according to the present disclosure, it is possible to provide a functional layer-equipped substrate for a non-aqueous secondary battery that can provide a battery component with high blocking resistance and cause excellent adhesiveness to be displayed both before and after immersion in an electrolysis solution.

Furthermore, according to the present disclosure it is possible to provide a method for producing a laminate for a non-aqueous secondary battery in which a separator substrate and an electrode substrate are adhered to one another through a functional layer, wherein the separator substrate and the electrode substrate are strongly adhered through the functional layer both before and after immersion in an electrolysis solution.

Also, according to the present disclosure, it is possible to provide a non-aqueous secondary battery having excellent battery characteristics such as high-temperature cycle characteristics and low-temperature output characteristics.

REFERENCE SIGNS LIST

100 particulate polymer
110 core portion
110S outer surface of core portion
120 shell portion

The invention claimed is:

1. A composition for a non-aqueous secondary battery functional layer comprising
a particulate polymer, wherein
the particulate polymer has a core-shell structure including a core portion and a shell portion that partially covers an outer surface of the core portion,
the core portion is formed by a polymer having a glass transition temperature of at least −50° C. and no higher than 60° C. and a degree of swelling in electrolysis solution of at least a factor of 5 and no greater than a factor of 30, and
the shell portion is formed by a polymer having a glass transition temperature of at least 50° C. and no higher than 200° C. and a degree of swelling in electrolysis solution of greater than a factor of 1 and no greater than a factor of 4.

2. The composition for a non-aqueous secondary battery functional layer of claim 1, wherein
the glass transition temperature of the polymer forming the core portion of the particulate polymer is lower than the glass transition temperature of the polymer forming the shell portion of the particulate polymer.

3. A functional layer-equipped substrate for a non-aqueous secondary battery comprising:
a substrate; and
a functional layer formed on the substrate, wherein
the functional layer is formed by using the composition for a non-aqueous secondary battery functional layer of claim 1.

4. The functional layer-equipped substrate for a non-aqueous secondary battery of claim 3, wherein
the substrate is a separator substrate or an electrode substrate.

5. A method for producing a laminate for a non-aqueous secondary battery in which a separator substrate, a functional layer, and an electrode substrate are laminated, the method comprising:
laminating the separator substrate and the electrode substrate with the functional layer in-between; and
heating the functional layer such as to cause adhesion, through the functional layer, of the separator substrate and the electrode substrate that have been laminated, wherein
the functional layer is formed by using the composition for a non-aqueous secondary battery functional layer of claim 1.

6. The method for producing a laminate for a non-aqueous secondary battery of claim 5, wherein
the glass transition temperature of the polymer forming the core portion of the particulate polymer is lower than the glass transition temperature of the polymer forming the shell portion of the particulate polymer, and
the heating of the functional layer is performed to a temperature that is at least as high as the glass transition temperature of the polymer forming the core portion of the particulate polymer and lower than the glass transition temperature of the polymer forming the shell portion of the particulate polymer.

7. A non-aqueous secondary battery comprising
a laminate for a non-aqueous secondary battery that is producible by the method for producing a laminate for a non-aqueous secondary battery of claim 5.

* * * * *